United States Patent [19]

Jiles

[11] Patent Number: 5,058,620
[45] Date of Patent: Oct. 22, 1991

[54] INSERTION ASSEMBLY FOR BORING A HOLE IN A PIPE

[76] Inventor: Stephen L. Jiles, 1513 Dogwood Ave., Anaheim, Calif. 92801

[21] Appl. No.: 605,968

[22] Filed: Oct. 29, 1990

Related U.S. Application Data

[62] Division of Ser. No. 513,599, Apr. 24, 1990.

[51] Int. Cl.⁵ .................. F16L 41/04; F16K 43/00; B23B 41/08
[52] U.S. Cl. .................................. 137/318; 408/67; 408/101; 408/207
[58] Field of Search .................. 137/15, 315, 318; 408/67, 92, 97, 203.5, 204, 205, 206, 207, 703, 101, 137, 138; 222/80, 81, 83; 83/54, 684, 685, 686

[56] References Cited

U.S. PATENT DOCUMENTS

| | | | |
|---|---|---|---|
| 2,287,354 | 6/1942 | Misch | 408/101 |
| 2,800,812 | 7/1957 | Mueller et al. | 408/67 |
| 2,899,983 | 8/1959 | Farris | 138/94 |
| 2,972,915 | 2/1961 | Milanovits et al. | 408/137 |
| 3,104,456 | 9/1963 | Powell, Jr. | 137/318 |
| 3,532,113 | 10/1970 | McKean | 137/318 |
| 3,669,139 | 6/1972 | Gajdos | 138/89 |
| 3,799,182 | 3/1974 | Long | 137/318 |
| 3,905,718 | 9/1975 | Luckenbill et al. | 137/318 |
| 3,995,655 | 12/1976 | Sanels | 408/67 |
| 4,057,357 | 11/1977 | Daghe et al. | 408/703 |
| 4,127,141 | 11/1978 | Ledonne et al. | 137/318 |
| 4,902,174 | 2/1990 | Thompson et al. | 408/101 |

OTHER PUBLICATIONS

Advertisement of T. D. Williamson, Inc. from Mar. 1990 issue of *Pipeline & Gas Journal*, "Circle 113".
Flier (not dated) put out by T. D. Williamson, Inc. re POLYSTOPP plugging system.

*Primary Examiner*—George L. Walton
*Attorney, Agent, or Firm*—Christie, Parker & Hale

[57] ABSTRACT

A method for cutting an opening in the side of a pipe carrying gas under pressure, providing a bypass through the cut, and terminating the bypass when the pipe has been repaired, and apparatus for performing steps of the method. A branching saddle is bonded to the pipe, and a fixture is mounted on the pipe at the saddle. The fixture comprises a barrel through which various tool-insertion assemblies may be inserted.

The tool-insertion assemblies typically include a shaft carrying a tool on one of its ends, a driving hub affixed near its opposite end, and a sealing plug slidably mounted axially on the shaft between the tool and the driving hub. The tools enter into the fixture's bore through a tool inlet, into which the sealing plug of the insertion assembly is screwed for a pressure-tight fit. The tools are individually inserted, in succession, through the fixture's bore and through the wall of the pipe. Lowering of the tools by means of the insertion assemblies into and out of the pressurized pipe is made possible by manipulation of a gate valve in the fixture, which allows the upper part of the bore to be depressurized prior to removal and during the insertion of different ones of the insertion assemblies.

6 Claims, 14 Drawing Sheets

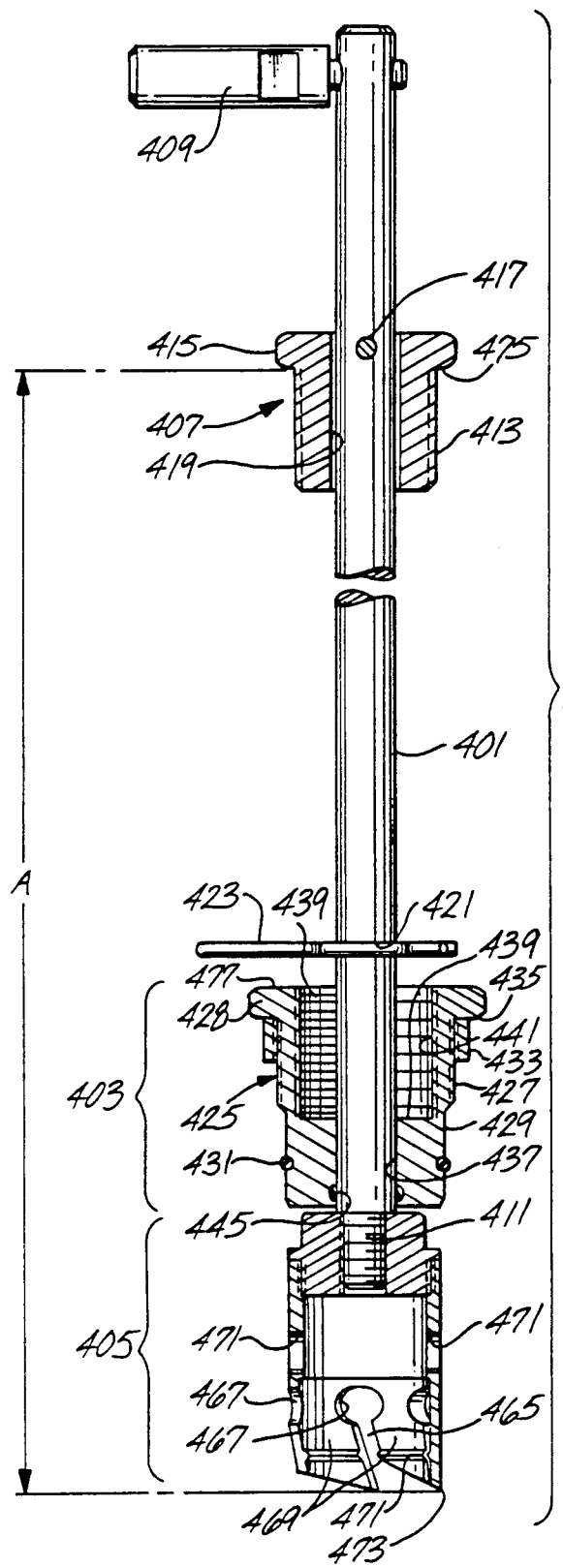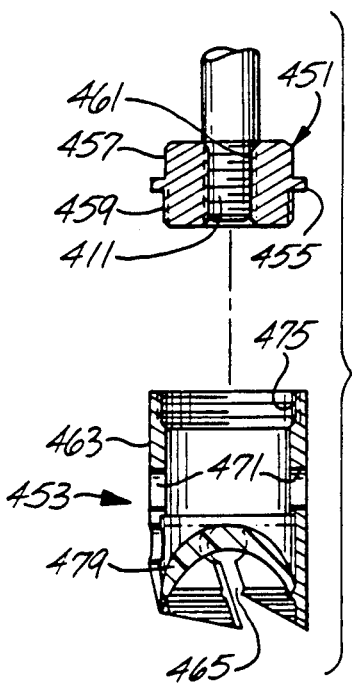
Fig. 7
Fig. 8
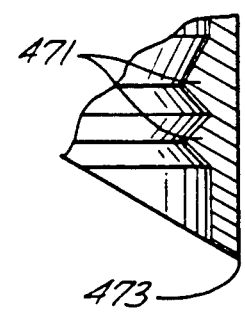
Fig. 9

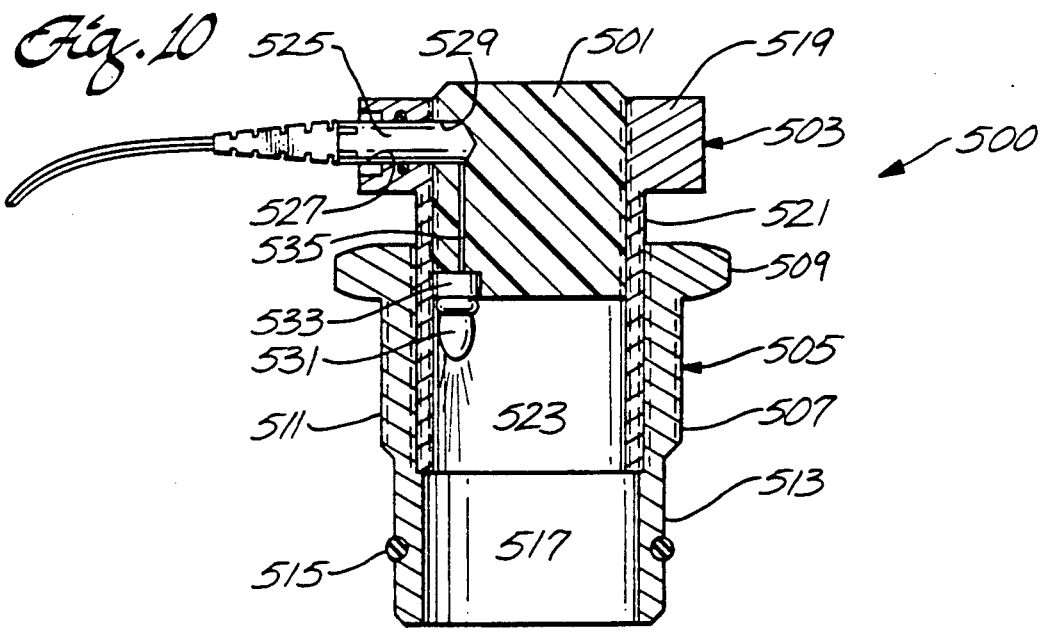
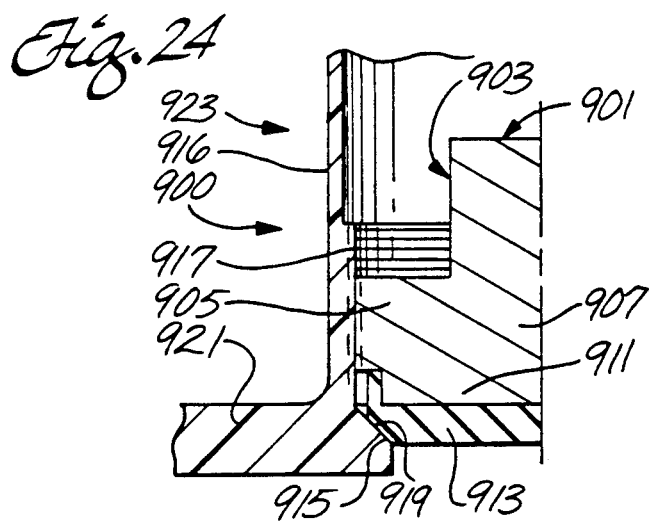
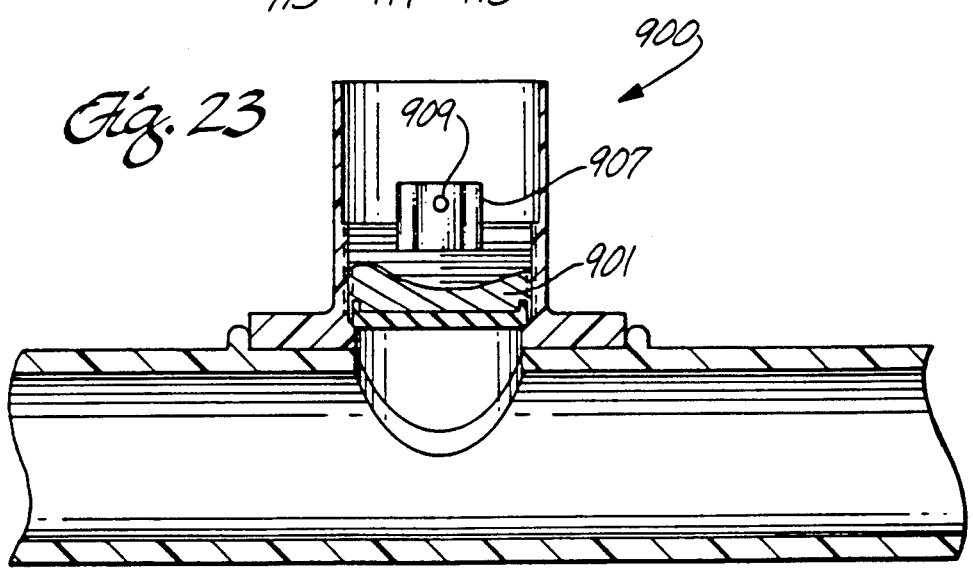

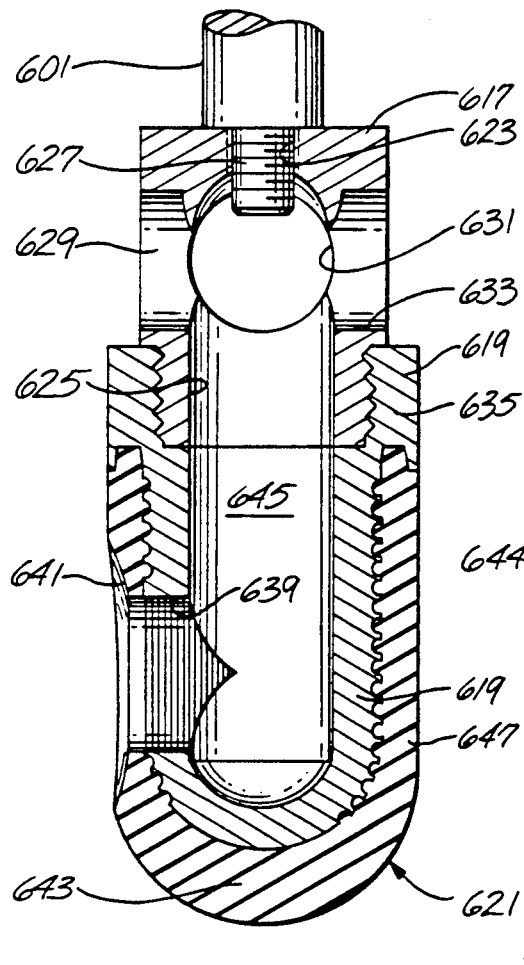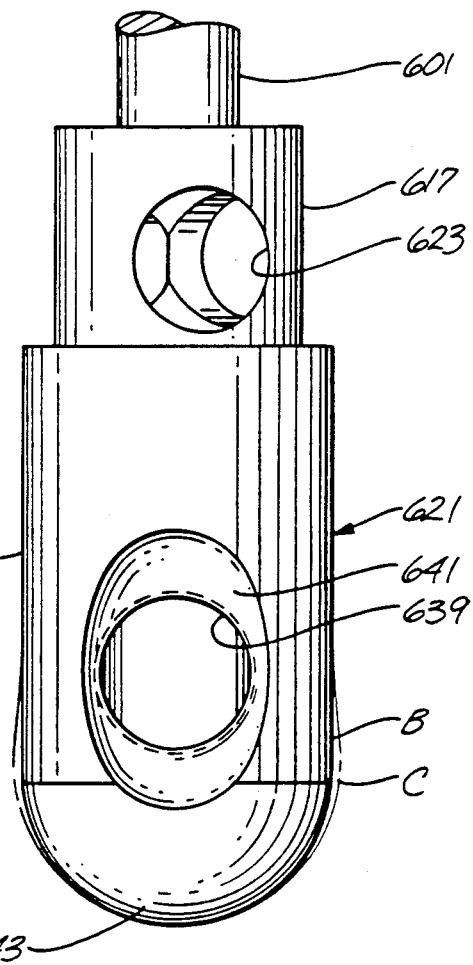

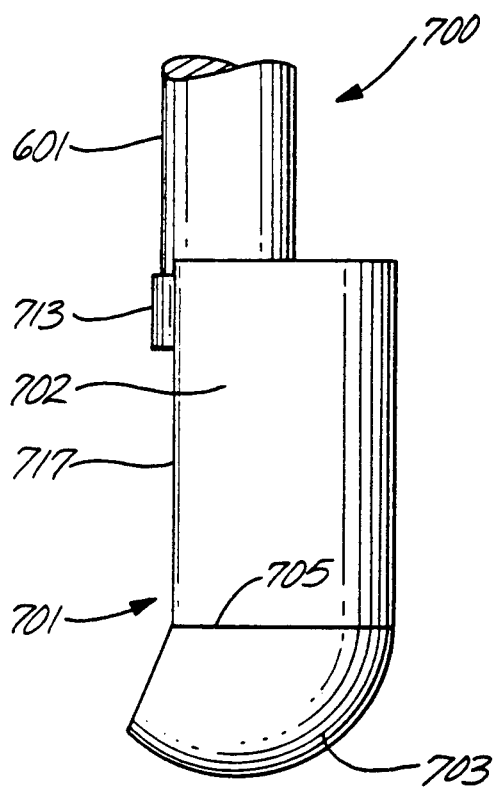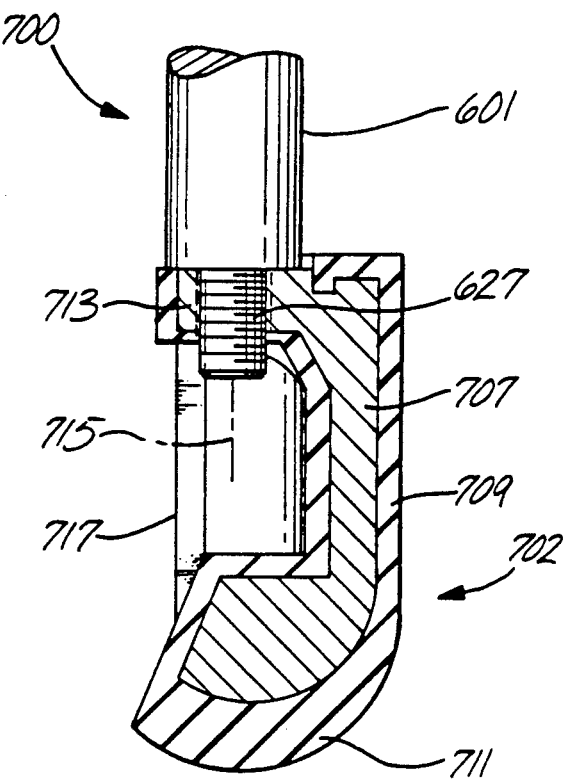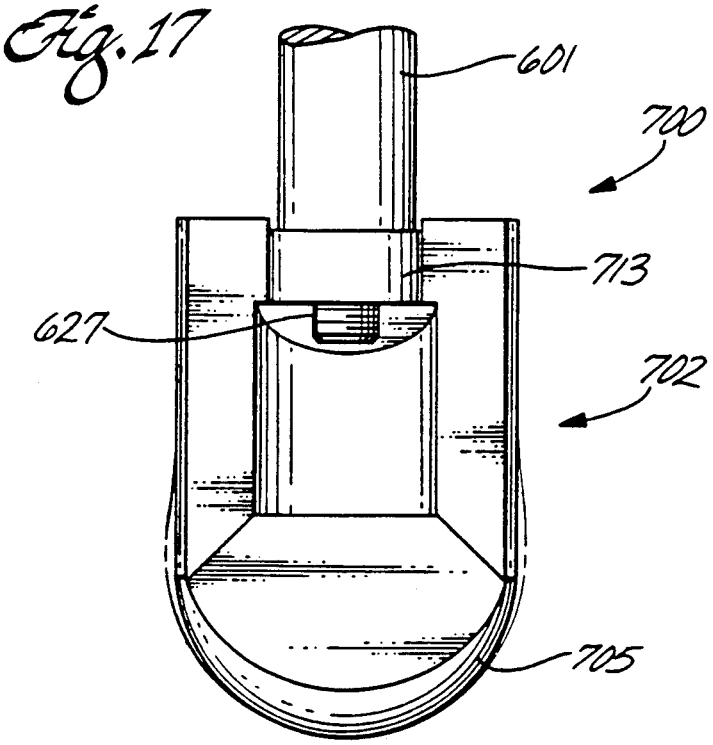

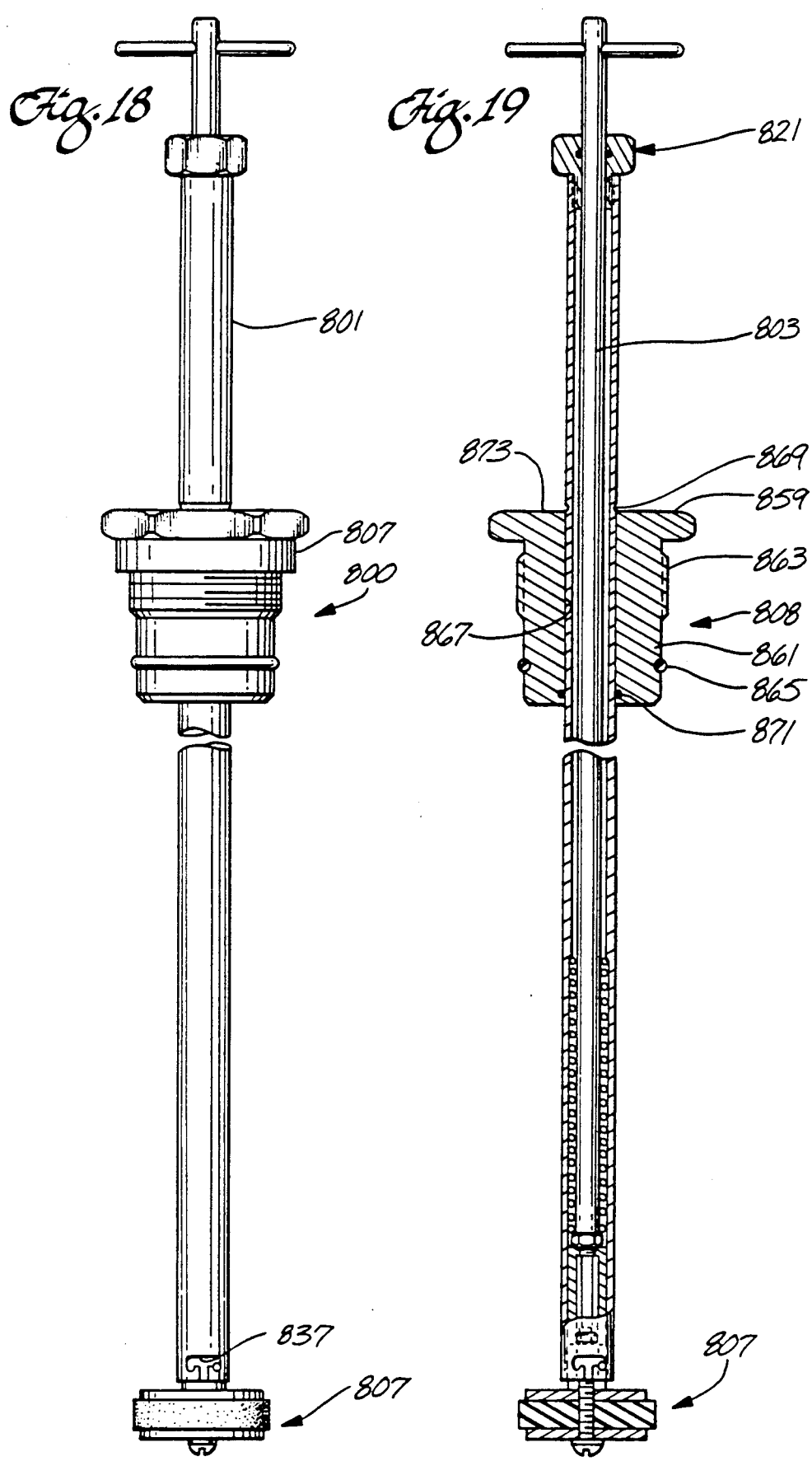

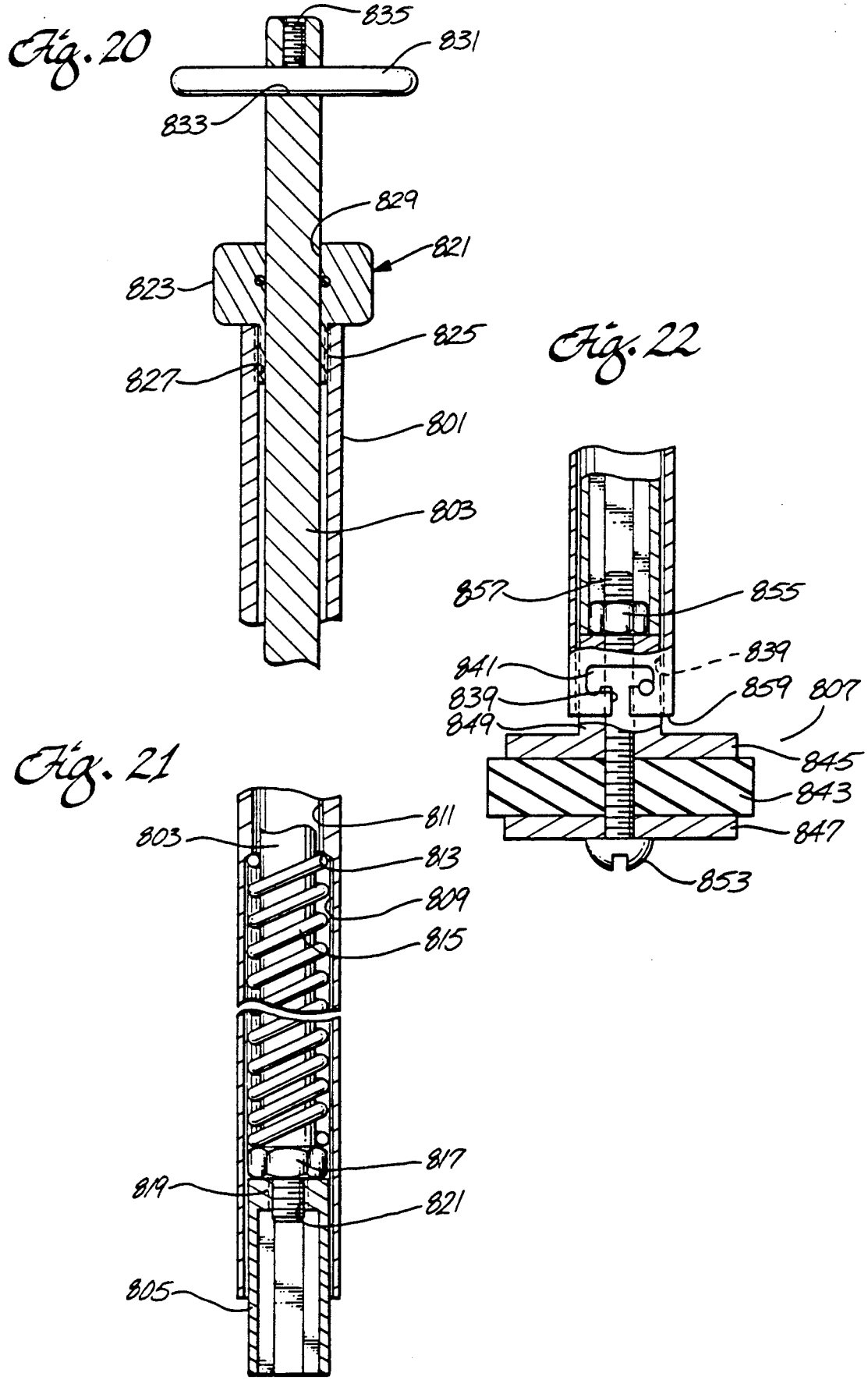

INSERTION ASSEMBLY FOR BORING A HOLE IN A PIPE

This is a division of application Ser. No. 07/513,599, filed Apr. 24, 1990.

FIELD OF THE INVENTION

The present invention relates generally to apparatus for repairing a pipeline which contains gas under pressure and, more particularly, to apparatus for boring a hole in a wall of such a pressurized pipeline.

BACKGROUND OF THE INVENTION

When a gas pipe breaks, several types of repairs may be desirable. If there is pressure in the pipe on both sides of the break, all that is necessary is to seal the pipe on both sides of the break. This allows service to be continued while the isolated section of pipe is repaired. Alternatively, gas may be fed through the pipe, under pressure, from a single source to consumers. In that event, if a break occurs between the source and the point of demand, and the pipe is sealed upstream of the break, all points downstream of the seal will be cut off from gas until the repair is made. If service is to be continued to consumers both upstream and downstream of the seal while the repair is being made, it is necessary to install a bypass around the break.

Gas pipes may be either metal or plastic, usually polyethylene. When a polyethylene gas pipe breaks, and the pipe is sealed so that it may be repaired, the seal is made by pinching. The apparatus necessary to effect this operation is quite large, since typical gas pipelines are about two inches in diameter and have a wall thickness of 3/16". Moreover, pinching the pipe in this manner and then reopening it by returning it by force to its initial round shape, weakens the pipe, making it vulnerable to breaks which may not occur until months later. This is particularly so in cold climates.

Machines exist whereby pipe may be sealed by boring a hole in the pipe on either side of the break, inserting a bypass stopper or plug through each of the holes, establishing a bypass connection between the two bypass plugs, repairing the break, and permanently sealing the inlets to the pipe where the bypass connection was made. Such machines include a fixture that permits a succession of tools to be applied to the pipe through a branching saddle while there is pressure in the pipe, the fixture including valving to permit the tools to be inserted and removed, notwithstanding the escape of gas under pressure from the pipe into the fixture. Existing fixtures of this type fail to maintain proper alignment between the pipe and the tools that are inserted into the pipe through the fixture. As a result, the tools tend to enter the pipe at an angle other than 90° to the pipe's centerline, an undesirable condition. Moreover, such fixtures tend to bend the pipe while it is being worked on, because the fixtures are affixed to the pipe by means of a pair of brackets which straddle that portion of the fixture through which tools are inserted into the pipe. Consequently, as pressure is applied to the tools and through them to the pipe, the pipe bends, due to the bending moment between the tools and the brackets on either side of them.

In the parent application Ser. No. 07/513,599, of which this is a divisional application, there are described and claimed apparatus and a method for sealing a gas pipe carrying gas under pressure, without deforming or bending the pipe and, if desirable, for providing a tap in that gas pipe whereby a bypass around a damaged section of the pipe may be effected. The apparatus and method are particularly adapted for use with a branching saddle, which is bonded by conventional means to the side of the pipe, plugging or tapping of the pipe being accomplished through the cylindrical pipe stub of the branching saddle. In carrying out the method, a series of operations necessary to accomplish the above objectives are performed by providing a set of tools, each for one of the operations. Each tool has a sealing plug, a shaft slidably extending through the plug, and a tool at the end of the shaft, movable between extended and retracted positions by sliding the shaft in the plug, the tool having a retracted position when it is nearest the plug and an extended position when it is farthest therefrom.

To allow the tools to perform their respective operations, there is provided a fixture having a wall defining a pressure chamber, divided by a valve into upper and lower portions. An upper inlet leads into the upper chamber portion, and a lower inlet leads into the lower chamber portion, there being additionally provided a valved pressure-release port leading through the side of the wall into the upper chamber portion.

In preparation for performance of the series of operations, a branching saddle having a cylindrical pipe stub is bonded to the pipe, the pipe stub extending at an acute angle to the pipe. The fixture is mounted on the pipe so that the stub enters the lower inlet of the fixture. Thereafter, successive ones of the tools are sequentially and individually inserted in the upper inlet so as to seal it, and, while so inserted, each tool is manipulated in conjunction with the valve and the valved pressure-release port so that the upper chamber portion is not pressurized while the tools are inserted or removed. In particular, each tool is inserted into the upper inlet while the tool is in its retracted position, until its sealing plug is fully seated in the upper inlet of the fixture. Thereafter, the valve which divides the fixture's upper and lower portions is opened and the tool is advanced into its extended position, wherein it engages the pipe through the branching saddle. Upon completion of the tool's operation, it is withdrawn to its retracted position, above the valve, which is then closed, and the valved pressure-release port is opened, after which the tool is removed from the fixture.

To allow the above method to be performed, disclosed apparatus which comprises at least one insertion assembly, including a shaft, a tool attached to the end of the shaft, and a cylindrical, externally-threaded sealing plug mounted slidably on the shaft. The insertion assembly is received by a fixture comprising a barrel having an internally-threaded inlet at one end for receiving the sealing plug, a second inlet at its opposite end for receiving a fitting, such as the branching-saddle pipe stub, and a bore extending between those ends. Between opposite ends of the barrel is a first valve for separating the bore into first and second mutually-pressure-isolated regions. A valved opening is provided for releasing pressure from the bore region nearest the threaded inlet, through the side of the barrel, prior to removal of each insertion assembly. A second, valved opening may be provided to allow gas to be diverted past a section of the pipe through the other bore region.

The fixture is installed by the expedient of means for attaching the barrel to the pipe so that the fitting on the pipe enters the second inlet of the barrel. Significantly, the tool carried by the insertion assembly is retractable into the bore region between the first, threaded inlet and the first valve and is extendable into engagement through the fitting with the pipe when the first valve is open.

Typically, the apparatus includes a plurality of insertion assemblies, each having a different tool thereon. These may include a cutter, a stopper for sealing the pipe, and a termination plug for sealing the fitting after an opening which has been cut in the pipe through the fitting by means of a cutter has served its purpose.

The means for attaching the barrel to the pipe is in line with the barrel so that, as tools are inserted into the pipe through the barrel exert pressure against the pipe, the pipe is not bent, because the point where the tool bears against the pipe is directly supported by the attaching means.

The attaching means includes a pair of interfacing clamping members, at least one of which includes an arcuate portion that is pressed against the pipe as the attaching means is tightened, forcing the pipe into a round configuration from the slightly-elliptical configuration which pipe normally tends to assume.

It is a further significant advantage of the apparatus just described that the fixture is centered on the branching-saddle pipe stub and in that the attachment means is effective to so mount the fixture on the pipe that the fixture is exactly square on the pipe, i.e., so that the centerline of the fixture is exactly at 90° to the centerline of the pipe. Because of the above relationships, when the fixture is attached to the pipe, the extension stub, which extends into the fixture, is oriented by the fixture so that the stub's centerline is at right angles to the centerline of the pipe, causing tools which enter through the pipe stub with a close fit to be aligned by the pipe stub so that the tools enter the pipe with their centerlines exactly at 90° to the centerline of the pipe.

A number of insertion assemblies are provided, one of them incorporating features of the present invention. One such serves to place a stopper into the pipe, through a branching saddle, and through a hole in the side of the pipe next to the branching saddle so as to plug the pipe to one side of the hole in the branching saddle. Such a hole is preferably out by means of the insertion assembly of the present invention, to be described. The stopper insertion assembly comprises a shaft and a stopper mounted on and extending from the ned of the shaft, the stopper having a body which is at least semi-cylindrical, the body terminating in a head which comprises at least part of a hemisphere. Preferably, the stopper body comprises a rigid core and a resilient skin on the core. The pipe may be blocked by inserting the stopper through the branching saddle and through the opening in the wall of the pipe. By pressing on the shaft, the stopper's resilient skin is deformed until the stopper conforms to the cross-section of the pipe, thereby effecting a complete block. To allow it to perform a bypass function, the stopper may be so contoured as to define a passage from the pipe through the branching saddle so that gas from the blocked pipe may be diverted through the branching saddle by means of the passage.

Another insertion assembly is for installing a completion plug in a branching saddle, the assembly comprising a tube having a camming groove at one of its ends, a shaft extending through the tube, and a spring-loaded socket extending partially into the grooved end of the tube and biased against further movement into the tube. Detachably carried on the grooved end of the tube is a plug which is adapted to be inserted by means of the tube into the branching saddle. The plug comprises an elastomeric disk sandwiched between a pair of pressure plates, the disk and plates being mounted on a common bolt and locked together by a nut on the bolt and retained thereon, one of the plates having means engageable with the camming groove to hold the plug in place on the tube when the retaining nut is pressed into the spring-loaded socket. Accordingly, the plug may be lowered into place in the branching saddle by means of the tube, and the elastomeric disk may be expanded grippingly into place in the branching saddle by turning the shaft within the tube, thereby driving the retaining nut along the bolt and driving the plates toward each other.

Finally, there is provided means for inspecting the pipe after each of several of the operations have been performed by the various insertion assemblies. The inspection device comprises a plug having a transparent core, the plug being insertable into the same inlet through which the insertion assemblies are admitted into the fixture. Preferably, the inspection device is in the form of an internally-threaded metal cylinder into which is screwed an externally-threaded plexiglass plug, with the internally-threaded cylinder also containing an electric light whereby the pipe may be illuminated and visually inspected by viewing it through the transparent core of the inspection device and through the bore of the fixture.

SUMMARY OF THE INVENTION

In accordance with the present invention, apparatus is provided for cutting a hole in the wall of a pressurized pipe through a branching saddle fitting. The apparatus includes a barrel having first and second sealable inlets at its opposite first and second ends. A valve within the barrel, between its ends, divides the barrel into first and second chambers adjacent the first and second ends of the barrel, respectively. A valved port extends into the first chamber through the wall of the barrel. The fixture is attached to the pressurized pipe so that the second end of the barrel fits onto the branching saddle fitting on the pipe. A threaded sealing plug is removably mounted in the first sealable inlet of the barrel. It has an axial bore. A shaft extends slidably through the bore of the sealing plug. Mounted on and extending axially from one end of that shaft is a cutter. Means are further provided for driving the shaft through the threaded sealing plug toward the pipe, thereby carrying the cutter into engagement with the wall of the pipe.

In accordance with a feature of the invention, the means for driving the shaft comprises a threaded lead hub, non-rotatably mounted on the shaft coaxially therewith. The lead hub is spaced apart from the cutter, is restricted against axial movement along the shaft toward the cutter, and is adapted to be threaded into the sealing plug. As a result, when the shaft is slid through the sealing plug, the lead hub may be screwed into the sealing plug by rotating the shaft, whereby the shaft and the cutter may be axially advanced, relative to the sealing plug, into the pipe.

Advantageously, there is additionally provided a second threaded sealing plug which is removably mountable in the first sealable inlet of the barrel in place of the first sealing plug. This second sealing plug has an axial bore. A second shaft extends slidably through the bore of the second sealing plug, and mounted on one end of the second shaft is a deformable stopper. Finally, second means are provided for driving the second shaft through the second sealing plug toward the pipe, until the deformable stopper is seated in and blocks the pipe.

Preferably, the second means for driving the second shaft also comprises, like the first driving means, a second threaded lead hub, non-rotatably mounted on the second shaft coaxially therewith, spaced apart from the stopper, and restricted against axial movement along the shaft toward the stopper. Like the first threaded lead hub, so the second threaded lead hub is restricted against axis movement along the second shaft toward the stopper, and is adapted to be threaded into the second sealing plug so that, when the second shaft is slid through the second sealing plug, the second lead hub may be screwed into the second sealing plug by rotating the second shaft, and the second shaft and the deformable stopper carried thereon may be axially advanced, relative to the second sealing plug, into the pipe.

In further keeping with the present invention, there is provided an insertion assembly adapted to carry a cutting tool through a fixture to bore a a hole through the wall of the pipe with the tool. It includes a shaft, a shell cutter mounted on and extending axially from one of the ends of the shaft, and a threaded lead hub non-rotatably mounted on the shaft coaxially therewith. The lead hub is spaced apart from the cutter and is restricted against axial movement along the shaft. A threaded sealing plug is slidably mounted coaxially on the shaft between the cutter and the lead hub and is adapted to receive the lead hub when the shaft is slid through the plug so that the lead hub may be screwed into the sealing plug by rotating the shaft, whereby the shaft and the cutter thereon are axially advanced relative to the sealing plug. Advantageously, the sealing plug has a set of external threads and is adapted to be screwed into the internally-threaded inlet of the barrel of a fixture of the type briefly described above. With the sealing plug so anchored in the fixture's threaded inlet, and with the threaded engagement of the lead hub in the sealing plug, the cutter may be advanced toward the pipe and rotated so as to effect its cutting action by turning the shaft, thereby screwing the lead hub into the sealing plug.

In further implementing this aspect of the invention, there is provided a shell cutter adapted for use with the last-recited insertion assembly which serves not only to cut a hole in the side of the pipe by removing a segment called a "coupon" therefrom, but which is also effective in capturing the coupon so that it does not fall inside the pipe and in capturing shavings which are a byproduct of the cutting process inside the cutter. The cutter comprises a cylindrical wall terminating in a cutting end and a plurality of circumferentially-distributed slots in the wall extending from the cutting end at an angle to the axis of the cylindrical wall and terminating in an arcuate cutout. Each section of the cylindrical wall extending between adjacent pairs of slots comprises a tooth of the cutter and has an end face which is inclined relative to a plane which is orthogonal to the axis of the cylindrical wall. An annular cutting ridge extends across the inside surfaces of the teeth so that, as the teeth bite progressively deeper into the pipe during the cutting process, the cutting ridge bites into the sides of the coupon being cut from the pipe, so engaging it that, when the cutter is withdrawn, it continues to grab the coupon and retains it within itself. Furthermore, the combined action of rotating the cutter and the circumferentially-distributed slots results in shavings passing up, through the slots and the arcuate cutouts, into the space in the cutter, above the coupon, so that both shavings and coupon are removed when the cutter is withdrawn.

BRIEF DESCRIPTION OF THE DRAWINGS

These and features and advantages of the invention will be more apparent from a reading of the claims and of the detailed description of the invention in conjunction with the drawings described below.

FIG. 7 is cross-section through the installation assembly of FIG. 6;

FIG. 8 is an exploded side view of the cutting tool of FIG. 7;

FIG. 9 is a partial cross-section through one of the teeth of the cutting tool of FIG. 7;

FIG. 10 is a cross-section through an inspection light which may with the fixture of FIG. 2 after use of the installation fixture;

FIG. 12 is a cross-section through the stopper of FIG. 11;

FIG. 13 is a side view of the stopper shown in cross-section in FIG. 12, showing in phantom lines the contour of its deformable skin when the shaft of the installation fixture is depressed;

FIG. 15 is a side view of an alternative embodiment of the stopper in FIGS. 11-14;

FIG. 16 is a cross-section through the alternative stopper of FIG. 15;

FIG. 17 is an end view of the stopper of FIG. 15;

FIG. 18 is a side view of an insertion assembly for inserting a completion plug into the branching saddle bonded to the pipe;

FIG. 19 is a cross-section through the insertion tool of FIG. 18;

FIG. 20 is an enlarged detail of FIG. 19, showing the top of the insertion assembly;

FIG. 21 is an enlarged view of the bottom of the insertion assembly of FIG. 19, showing, in particular, the mounting of spring-loaded socket in the end of its tube;

FIG. 22 is an enlarged view of the end of the insertion fixture of FIG. 19, with the completion plug in place in the spring-loaded socket;

FIG. 23 is a cross-section through the pipe and the branching saddle and through an alternative completion plug therein; and FIG. 24 is an enlarged detail of FIG. 23, showing how the alternative completion plug engages the branching saddle.

DETAILED DESCRIPTION

Figure 1:
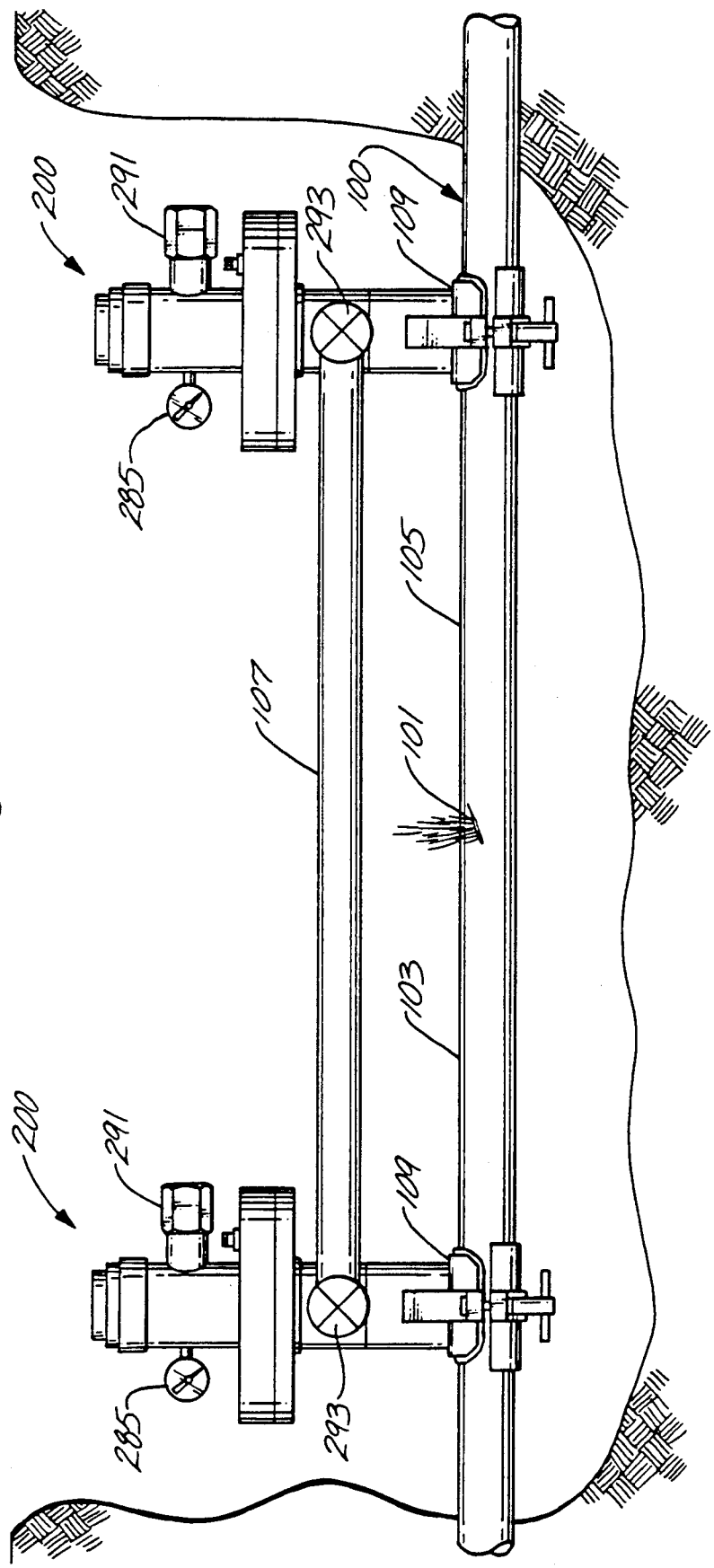
FIG. 1 is side view of an excavation showing a pipeline with a break in it and a pair of fixtures straddling the break, the fixtures being connected by an optional bypass line.

With initial reference to FIG. 1, the invention will be described in its preferred mode in the context of a pipeline 100 suffering a break 101. It will be assumed that gas is supplied under pressure from the upstream portion 103 of the pipe so that, if the upstream portion 103 of the pipe is blocked, consumers connected to the downstream portion 105 of the pipe will be cut off unless other provision is made. Therefore, the situation depicted in FIG. 1 requires a bypass around the break 101, and, hence, what is illustrated there are a pair of fixtures 200, each for providing a tap into a respective one of the pipeline sections 103 and 105, and a bypass conduit 107 connecting the two fixtures. In general terms, where the situation is as just described, after each of the fixtures 200 has been affixed to the pipe 100, a series of insertion tools is applied through each of the fixtures to its respective associated pipe section 103 and 105, in order to establish a bypass through the bypass conduit 107. In the order in which they are used, the insertion assemblies include a cutting tool insertion assembly 400 (FIGS. 6–9), a stopper insertion assembly 600 (FIGS. 11–14) or alternative stopper insertion assembly 700 (FIGS. 15–17), and a completion plug insertion assembly 800 (FIGS. 18–22) or alternative completion plug insertion assembly 900 (FIGS. 23 and 24). Additionally, between operations performed by successive ones of the insertion assemblies, an inspection light 500 (FIG. 10) is installed in the top of each fixture 200, to allow an operator to view the results of the operation carried out by that insertion assembly.

Figure 2:
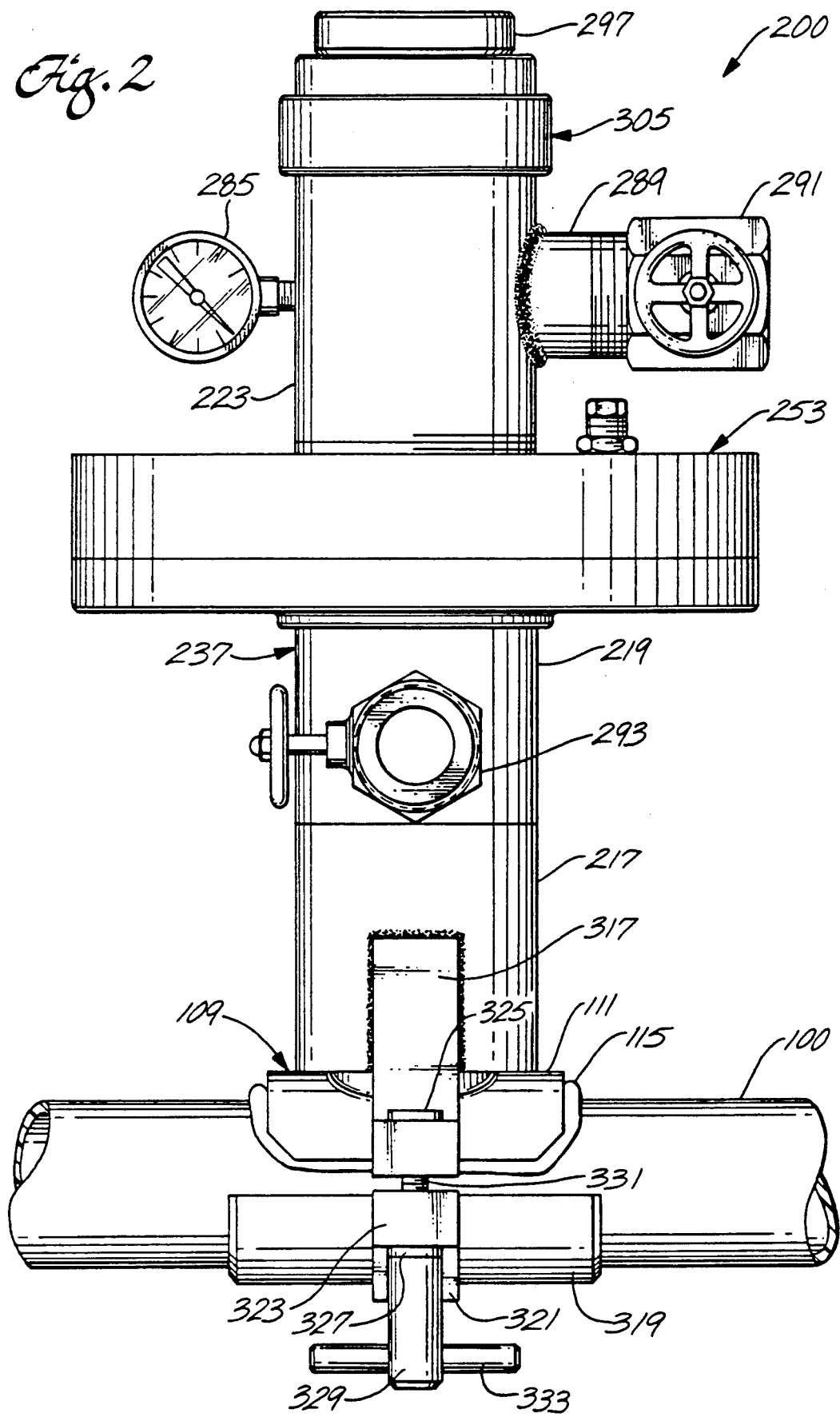
FIG. 2 is a side view of one of the fixtures affixed to the pipe.
Figure 3:
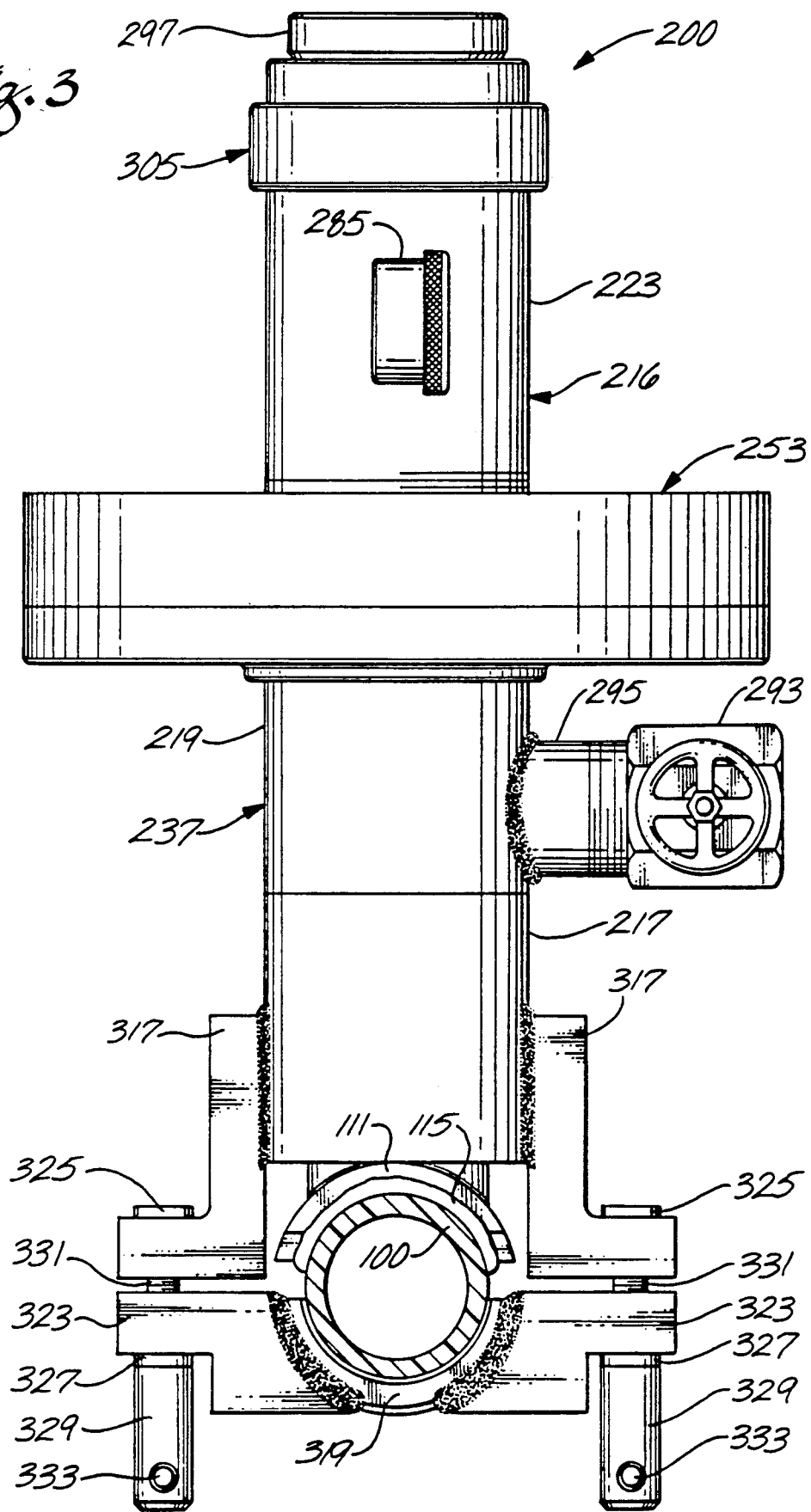
FIG. 3 is an end view of one of the fixtures, with the pipe upon which it is affixed being shown in cross-section.
Figure 4:
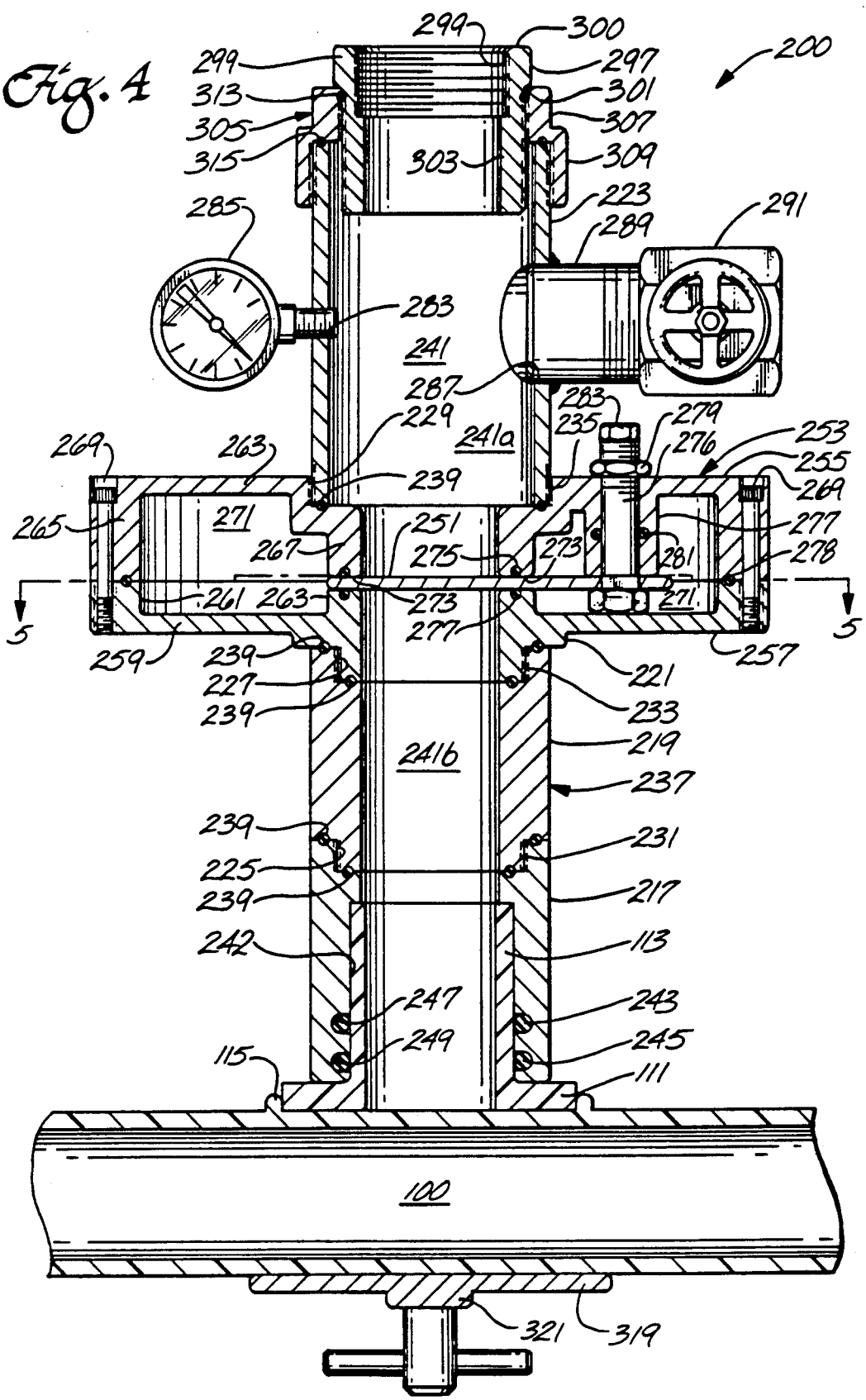
FIG. 4 is a cross-section through the fixture and pipe of FIGS. 1 and 2.

Turning FIGS. 2–4, the first step in using the fixture 200 and its associated insertion assemblies and accessories 300–900 is to install a branching saddle 109 at each location where a tap is to be made in the pipe 100 around the break 101. Since the operations that need to be performed are identical at both of the fixtures 200, only one of them will be described, it being understood that the same structure will be used and the same series of operations will be performed at both fixtures (unless otherwise noted).

The branching saddle 109 may be of a conventional, passive type having a part-cylindrical saddle portion 111 and a pipe stub 113, whose centerline is orthogonal to the axis of the saddle portion 111. The branching saddle 109 is bonded, by conventional means, to the pipe 100 by welding performed by applying a heating iron, appropriately contoured to the saddle portion, until the interface of the saddle portion 111 and the pipe 100 melts and bonds, as indicated by the bead 115. Because of the melting of the saddle-pipe interface, the centerline of the pipe stub 113 may not be exactly at a 90° angle to the centerline of the pipe 100. Alternatively, the fixture 200 may also be used with an active saddle in which heating elements are embedded so that the saddle portion may be bonded to the pipe without the use of an iron, simply by applying current from an electric source to the heating element embedded in the branching saddle.

The fixture 200 comprises a barrel formed of telescoped sections 217, 219, 221, and 223. Respective ones of the sections 217, 219, and 221 have internally-threaded upper rims 225, 227, and 229, and the sections 219, 221, and 223 have externally-threaded, reduced ends 231, 233, and 235, which are threaded into respective ones of the threaded rims 225, 227, and 229 to form an integral, high-strength barrel 237. O-rings 239, between each of the joined sections of the barrel 237, provide a pressure seal between them so as to enable the barrel 237 to maintain gas under the pressures encountered in a pipeline, i.e., up to 100 psi.

Extending axially through the barrel 237 is a bore 241, formed by the walls of the sections 217, 219, 221, and 223. The region of the bore 241 formed by the bore section 217 has an enlarged inlet region 242, which is sized to receive the branching saddle pipe stub 113. A pair of O-rings 243 and 245, retained in peripheral grooves 247 and 249 in the enlarged bore portion 241, ensure a seal between the barrel portion 217 and the branching saddle 109. The barrel section 217 may be interchanged with one which is differently contoured on the inside, so as to receive the pipe stub of an active branching saddle.

Figure 5:
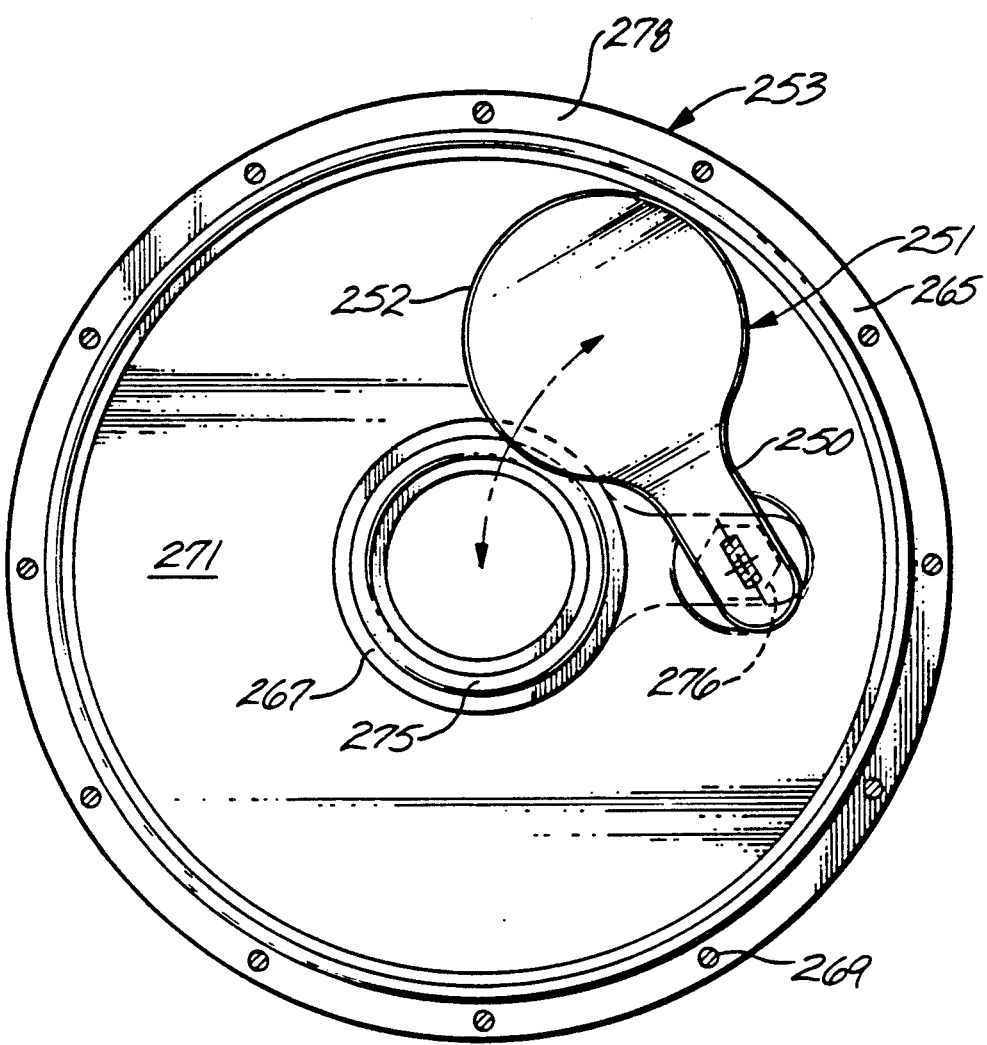
FIG. 5 is a cross-section through the fixture of FIGS. 2 and 3 lines 5—5, illustrating the gate valve for separating upper and lower regions of the fixture.
Figure 6:
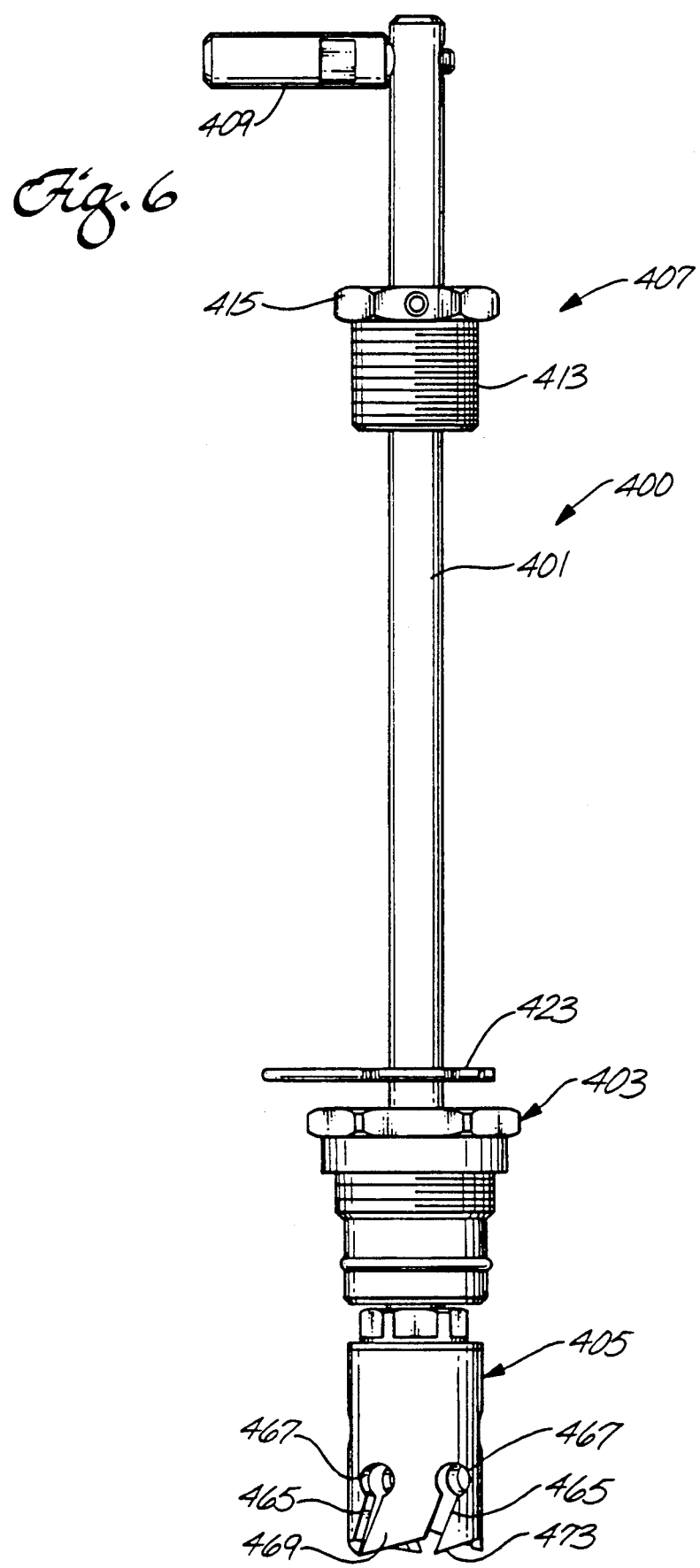
FIG. 6 is a side view of an installation assembly with a cutting tool carried on its end.

Extending through the portion of the bore 241 formed by the barrel section 221 is a gate valve 251, whose function it is to divide the bore 241 into upper and lower-chamber, pressure-isolated regions 241a and 241b. The barrel section 221 forms the hub of a drum assembly 253, whose function it is to house the gate valve 251 in its open position, as best seen in FIG. 5. The drum assembly 253 is formed of upper and lower plates 255 and 257. The lower plate 257 has a disk-shaped, radially-extending bottom 259, an outer, peripheral wall 261, and an internal, annular wall 263. The upper plate 255 has a disk-shaped top 263 (similar to the bottom 259), an outer, peripheral wall 265, and an inner, annular wall 267. Holding the upper and lower plates 255 and 257 together are a set of threaded bolts 269. The bottom 259, the top 263, and the walls 265 and 267 define a toroidal chamber 271, which is adapted to receive the gate valve 251. In its closed position across the bore 241, the gate valve 251 resides in an annular slot 273, formed by the spaced-apart faces of the annular walls 263 and 265. A pressure seal between the gate valve 251 and the slot 273 is provided by a pair of O-rings 275 and 277 seated in the annular, inner walls 263 and 267. They assure that, when the gate valve 251 is closed, the upper bore region 241a is isolated from the lower bore region 241b. An additional O-ring 278, between the outer peripheral walls 261 and 265, is provided to maintain gas under pressure within the drum assembly 253 when the gate valve 251 is open.

Extending from the circular body 252 of the gate valve 251, is an anchoring stem 250 for rotating the valve (FIG. 5). The anchoring stem 250 is pinned to a threaded bolt 275, which is rotatably mounted in a boss extending from the upper chamber plate 255. The bolt 275 is held in place by a nut 279. An O-ring 281 provides a seal between the boss 277 and the bolt 275. The valve 251 may be turned between open and closed positions by applying a wrench to the hexagonal end 283 of the bolt 275.

To allow monitoring of pressure in the bore 241, a threaded opening 283 is provided in the barrel section 223 (FIG. 4), into which is installed a pressure gauge 285. Venting of pressure from the upper chamber region 241a of the bore 241 is accomplished through an opening 287 in the same barrel section 223, to which is welded a threaded, cylindrical section 289, forming a venting port on which there is installed a ball valve 291 (hereinafter, the "secondary ball valve"), which may be of conventional construction. A similar ball valve 293

(hereinafter, the "primary ball valve"), which serves to provide the bypass path through the conduit 107 in FIG. 1, is installed on a cylindrical section 295 (FIG. 5), welded to the barrel section 219, and communicating with the lower chamber region 241b through an opening in the wall of the barrel section 219, similar to the opening 287, but not shown.

Provided at the top end of the fixture 200 is an inlet for admitting respective ones of the accessories 300-900. Forming part of the inlet is a tool receptacle 297, comprising a socket having an annular rim 299 at its upper end and transitioning at a shoulder 301 to a reduced, externally-threaded terminal portion 303. The tool receptacle is internally threaded within the rim 299 and partially into the body of the terminal portion 303 to receive various ones of the accessories 300-900. Because those accessories are made of steel, it is preferable that the tool receptacle 297 be made of steel as well. The steel receptacle 297 is anchored at the inlet to the barrel section 223 by a coupling collar 305, which may be of aluminum, as may all of the sections comprising the barrel 237. The coupling collar 305 has a reduced upper section 307 and an enlarged lower section 309. The collar section 307 is provided with threads matching the external threads of the tool receptacle 297, and the enlarged coupling collar portion 309 is provided with a set of internal threads engaging matching external threads at the upper end of the barrel section 223. O-rings 313 and 315 between the coupling collar 305 and the insertion collar 297 and the barrel section 223, respectively, provide a pressure seal between the barrel section 223 and the receptacle 297.

The fixture 200 is installed on the pipe 100 by placing it with its bottom barrel section 217 facing the saddle pipe stub 113 and lowering it thereon, so that the pipe stub enters the inlet 242 of the barrel section 217 until the bottom of the barrel section abuts the saddle portion 111. The pipe stub 113 fits tightly within the bore of the barrel section 217 and a seal between them is maintained by O-rings 243 and 245. A pair of L-shaped upper bracket members 317 are welded to the barrel section 217 to form the top part of an attachment bracket whose bottom comprises a cradle 319 having a central, reinforced, thickened region 321. The cradle 319 is contoured so that its inside surface matches the size and shape of the pipe 100 when the pipe is perfectly round.

Welded to and extending from either side of the cradle 319 are a pair of lower bracket members 323. Steel inserts 325 extend into holes (not shown) through the bases of the L-shaped brackets 317, and steel inserts 327 extend into holes (not shown) in the terminal ends of the lower bracket portions 323. Steel bolts 329, having threaded shanks 331 and handles 333, extend through the upper and lower brackets 317 and 323 and threadably engage their respective steel inserts 325 and 327. The upper and lower bracket members 317 and 323 and the parts associated therewith comprise means in line with the barrel 237 for attaching the fixture 200, and the barrel in particular, to the pipe 100.

By turning the handles 333, the upper and lower brackets 317 and 323 are driven toward each other, causing the bottom barrel section 317 to be firmly seated against the saddle portion 111 of the branching saddle 109. Moreover, by pressing the pipe 100 against the cradle 319, the pipe is forced to assume a round shape, as opposed to a slightly-elliptical shape, which the pipe otherwise tends to assume. As a further consequence of driving the upper and lower brackets 317 and 323 toward each other, the centerline of the pipe 100 is squared to a 90° angle relative to the centerline of the fixture's inlet 242 and, hence relative to the centerline of the branching-saddle pipe stub 113. Consequently, when a tool, whose outside diameter closely matches the inside diameter of the pip stub 113 enters the pipe through the pipe stub, the tool will be guided by the pipe stub so that the tool's centerline will also be at a 90° angle to the centerline of the pipe 100 and, since the centerline of the pipe stub 113 intersects the centerline of the pipe 100, the center-line of the tool will do so as well.

Turning next to FIGS. 6-9, there will be described the first insertion assembly incorporating features of the present invention which is used to operate on the pipe 100 through the fixture 200. Cutter-insertion assembly 400 and its principal parts comprise a shaft 401, a sealing plug 403, a cutter 405, and a lead hub 407. The shaft 401 has a handle 409 screwed through an opening at one end and terminates in a threaded stub 411 at its opposite end. The tool 405 is supported on the stub 411 (FIG. 7). The lead hub 407 comprises an externally-threaded body 413 and a hexagonal head 415, with a pin 417 extending through a hole in the hexagonal head 415 into a corresponding hole in the shaft 401. An axial bore 419, slightly larger than the diameter of the shaft 401, extends through the lead hub 407, allowing it to rock slightly on the shaft 401 about the pin 417, for reasons to be explained later. Located immediately above the sealing plug 403 in the shaft 401 is a through-hole 421, through which extends a removable spring clip 423.

The sealing plug 403 comprises a socket member 425 having an hexagonal head 428, from which extends an externally-threaded cylindrical section 427 terminating in a reduced, unthreaded section 429 carrying an external sealing O-ring 431. A spacing ring 433, having an internal thread to match the thread on the cylindrical section 427, is screwed onto that section until it abuts the lower surface 435 of the hexagonal head 428.

Extending through the unthreaded terminal section 429 is an axial bore 437, dimensioned to closely fit the external diameter of the shaft 401. Extending into the sealing plug 403 from its upper end toward the bore 437 is a counterbore 439, having threads 441 adapted to receive the threads 413 of the lead hub 407 when the spring clip 423 is removed from the shaft 401.

As best seen in FIG. 8, the cutting tool 405 comprises two parts: a cutter hub 451 and a shell cutter 453. The hub 451 is generally cylindrical in shape, with a radially-extending, circumferential flange 455 circling the midsection of the hub, the hub body having a hexagonal cross-section 457 above the flange (as viewed in FIG. 8) and an externally-threaded, cylindrical portion 459 extending below the flange. A threaded bore 461 extends axially through the hub 451.

Turning to the shell cutter 453, it comprises a steel cylinder 463, having slots 465 cut into one of its ends, with the slots extending at an angle to the centerline of the cylinder 463, each slot 465 terminating in a circular cutout 467. The slots 465 define a plurality of teeth 469 having end faces 471, which are inclined relative to a plane which is orthogonal to the centerline of the cylinder 463.

As best seen in FIG. 9, a set of ridges 471 extend around the insides of the shell-cutter teeth 469, just short of their tips 473.

The upper end of the shell cutter 453 terminates in an internally-threaded rim 475, the threads therein being matched to receive the threads 459 of the cutter hub 451.

To assemble the cutter 405, the cutter hub 451 is screwed onto the shaft stub 411 until the flange 455 bottoms on the shaft as shown in FIG. 8. Thereafter, the shell cutter 453 is screwed onto the threaded portion 459 of the hub 451. To allow the cutter to be tightened securely, a pair of diametrically-opposed holes 471 are provided in the wall of the cylinder 463, so that a pin may be inserted through them to turn the cutter 453 onto the hub 451.

Operation of the insertion assembly 400 and, in particular, the cutter 405 thereon, begins by lifting the assembly 400, so that it is above the fixture 200, and carefully inserting the assembly 400, with the cutter 405 leading through the fixture receptacle 297. The sealing plug 403 is then screwed into the receptacle 297 until the spacing ring 433 bottoms on the top face 300 of the receptacle 297. With the spring clip 423 located on the shaft 401, as shown in FIG. 7, the entire insertion assembly 400 will be positioned above the gate valve 251, because the spring slip 423 will abut against the face 300 of the receptacle 297. The gate valve 251 is then opened. The spring clip 423 is removed from the shaft 401, and the shaft is pushed down into the fixture 200, toward the pipe 100, until the threads on the lead hub body 413 engage the internally-threaded counterbore 439 of the sealing plug 403. The handle 409 is then turned, driving the lead hub 407 into the sealing plug 403, marking the start of the cutting operation. Preferably, the cutter 405 is sized to fit snugly through the branching-saddle pipe stub 113 so as to cut a matching hole in the wall of the pipe 100. Lowering of the cutter 405 through the branching-saddle pipe stub 113 is made easier by the fact that the shaft 401 is able to move slightly within the lead hub 407, due to the clearance between its internal bore 419 and the shaft.

As the handle 409 is turned, and the lead hub 407 is driven into the sealing plug 403, the shaft 401 both rotates and advances toward the pipe 100, causing the cutter teeth 469 to bite into and begin cutting through the wall of the pipe 100. It should be noted that the lead hub 407 is so positioned on the shaft 401 relative to the tips 473 of the cutter teeth, that the tooth tips 473 are spaced slightly above the pipe when the threads on the lead hub 407 and the sealing plug 403 first engage. The cutting operation continues until the bottom face 475 of the lead hub's hexagonal head 415 abuts the top face 477 of the sealing plug's hexagonal head 428. The distance between the bottom face 475 and the tips 473 of the cutter teeth 469, shown in FIG. 7 as the dimension A, is selected so that, when the surfaces 475 and 477 abut, the tooth tips 473 will be at exactly the midpoint of the pipe 100, thereby avoiding any grooving of the pipe's bottom half which might result if the cutter were to proceed past the pipe's midpoint.

The outside diameter of the shell cutter 453 should be only slightly smaller than the inside diameter of the branching-saddle pipe stub 113 and the pipe 100 so that the cutter 453 will be guided by the pipe stub 113 at a 90° angle to the centerline of the pipe 100 and with the centerline of the cutter intersecting the centerline of the pipe 100. That being so, and with the cutter teeth extending exactly to the midpoint of the pipe 100, there will be cut out of the wall of the pipe an arcuate wall segment, commonly referred to as a "coupon" and shown in FIG. 8 as the arcuate member 79. As a specific result of the inventive configuration of the cutter 453, the ridges 471 on the insides of the cutter teeth 469 grab the outside edges of the coupon 479 so that, when the cut is complete, and the tool is withdrawn by rotating the shaft 401 counterclockwise, the coupon 479 is withdrawn with the shell cutter 453. Moreover, the pipe shavings which are generated during the cutting process travel up through the slots 465 and enter the inside of the cutter through the cutouts 467, where they remain in a chamber whose wall is the cutter 453 and whose floor is formed by the pipe coupon 479. The coupon and shavings may then be removed by removing the cutter 453 from its hub 451.

As a result of the preceding step, during which the wall of the pipe 100 has been penetrated, pressure in the entire fixture 200, including its bore 241 and the toroidal space 271 within the drum assembly 253, will have risen to that prevailing in the pipe 100. Withdrawal of the shell cutter 453 is completed by continuing to turn the shaft 402 by its handle 409 until the lead hub 407 is completely unthreaded from the sealing plug 403. At this point, the shaft 401 is pulled up, until the top of the cutter hub 451 abuts the bottom of the sealing plug 403. This brings the hole 421 through the shaft 401 back above the sealing plug 403, allowing the spring clip 423 to be reinserted so as to lock the assembly in place entirely above the gate valve 251. The gate valve 251 is then closed, and the secondary release valve 291 is opened to vent gases in the upper bore portion 241a, so as to reduce pressure therein to atmospheric. Once this has been accomplished, the insertion assembly 400 may be removed from the fixture 200 by unscrewing the sealing plug 403 from the receptacle 299 of the fixture 200 and lifting out the assembly 400.

The next step in the process is to inspect the cut that was just made. The inspection light 500 provided for this purpose is shown in FIG. 10. It comprises a clear, plexiglass plug 501 in a housing 503, which is screwed into a light-sealing plug 505. The light-sealing plug 505 serves a similar function to the cutter-sealing plug 403 of FIG. 6 and is similarly configured on the outside. Thus, it includes a barrel 507, which extends from a hexagonal nut 509 and which has a relatively-thick, externally-threaded root portion 511 and a relatively-thin, smooth terminal portion 513, which carries an O-ring 515 near its end. The light-sealing plug 505 has an axial bore 517, which extends through its entire length. The upper portion of the bore 517 is threaded.

The light housing 503 is shaped similarly to the sealing plug 505. It, too, has a hexagonal head 519, from which extends a barrel 521, the barrel being threaded on the outside, to match the threads on the inside of the plug 505, as well as on the inside. An axial bore 523 extends throughout the length of the housing 503. Inside the upper half of the housing 503, the window 501 is a slightly tapered, clear, plexiglass plug with threads on the outside which conform to the internal threads of the housing 503. The external threads on the plug 501, the internal and external threads on the housing 503, and the internal threads on the sealing plug 505 are all pipe threads. The external threads on the sealing plug 505 are regular, machine threads.

An electrical connector 525 extends through an opening 527 in the wall of the hexagonal head 519, into a recess 529 in the window 501. An electric light bulb 531 is held in a light socket 533, embedded in the plexiglass window 501. If desired, the connector 525 may be embedded in the window 501 as well. A pair of wires 535 complete the electric circuit to the light bulb 531 from a source of electric power (not shown).

To assemble the inspection light 500, a sealing tape (not shown) is wrapped around the external pipe thread on the light-housing barrel 521, and the barrel is then screwed, as far as it can be turned, into the light-sealing plug 505. The external pipe threads of the plexiglass window 501 are preferably coated with a sealant, and the window is then threaded into the light housing 503, so that the recess 529 is aligned with the opening 527 in the hexagonal head 519.

Turning to FIG. 4, to inspect the results of the pipe-cutting step, the inspection light 500 is installed by screwing its sealing plug 505 into the receptacle 297 of the fixture 200. While this is being done, the gate valve 251 is still closed, as is the secondary ball valve 291. With the inspection light 500 securely tightened, the gate valve 251 may now be turned into its opened position, the light bulb 531 may be illuminated, and the pipe 100 may be visually inspected through the window 501. After the visual check has been made, the gate valve 251 is closed, the secondary ball valve 291 is opened to release any pressure from the upper chamber portion 241a, and the light may then be unscrewed and removed. The secondary ball valve 291 is then closed in preparation for the next step, which is the installation of a stopper into the pipe 100.

Two alternative embodiments are disclosed. The first of them, appearing in FIGS. 11-14, will be described next. The stopper-insertion assembly 600 includes a shaft 601 with a handle 603, a driving hub 605, a sealing plug 607, and a stopper assembly 609. The shaft 601, handle 603, and sealing plug 607 are substantially similar to their counterparts in FIG. 7. The shaft 601 carries a collar 611, which is pinned to the shaft and serves to advance the shaft axially when the driving hub 605 is screwed into the sealing plug 607. Since the sealing plug 607 is identical to the sealing plug 403 in FIG. 7, its details are shown, but will not be described again. It is sufficient to note that it is provided with an internal recess, which is threaded to receive the external threads 613 of the driving hub 605, and terminates in a reduced bore, such as the bore 437 of FIG. 7, through which the shaft 401 may slide, and into which it closely fits. A spring clip 615 normally resides in an opening (not shown) through the shaft 601.

Referring to FIG. 12, the stopper assembly 609 comprises an apertured, steel collar 617, a rigid, preferably steel, core 619, and an elastomeric skin 621. The collar 617 is cylindrical, with upper and lower axial openings 623 and 625. The upper opening 623 is threaded and receives the reduced, threaded end 627 of the shaft 601. Radial openings 629, 631, and 633 intersect with the lower axial opening 625.

The steel core 619, U-shaped in cross-section, is provided with a threaded inlet 635, which receives the externally-threaded, reduced end 637 of the apertured collar 617. Extending through the wall of the steel core 619 is an inlet/outlet opening 639, which is threaded to receive a molding tool (not shown) that is used to form the elliptical contour of the elastomeric skin 621 around the opening 639. Grooves, about ⅛-inch apart, are formed in the surface of the core 619 to help retain the elastomeric skin 621.

When the elastomeric skin is to be formed, a bolt (not shown) is threaded into the opening 639. The bolt has an arcuate plate (not shown) attached to it which is used to scoop out the arcuate contour 641 in the elastomeric skin 621 which surrounds the inlet/outlet opening 639. The elastomeric skin 621 is formed by inserting the steel core 619 in a mold, with the bolt inserted in the opening 639. In keeping with the present invention, the mold is so shaped that, when elastomer is poured into the space between the mold and the steel core 619, the head 643 is formed to be thicker than the side-wall portion 645. The reason for this will become apparent when use of this implement is explained. After the elastomeric skin has been formed, the scooping action is carried out, to provide the smooth, accurate contour 641, after which the tool (not shown) is removed from the inlet/outlet opening 639. It will be observed that a path is provided through the inlet/outlet opening 639, the chamber 645 formed by the interior of the steel core 619 and through the axial and radial openings 625 and 631.

Figure 11:
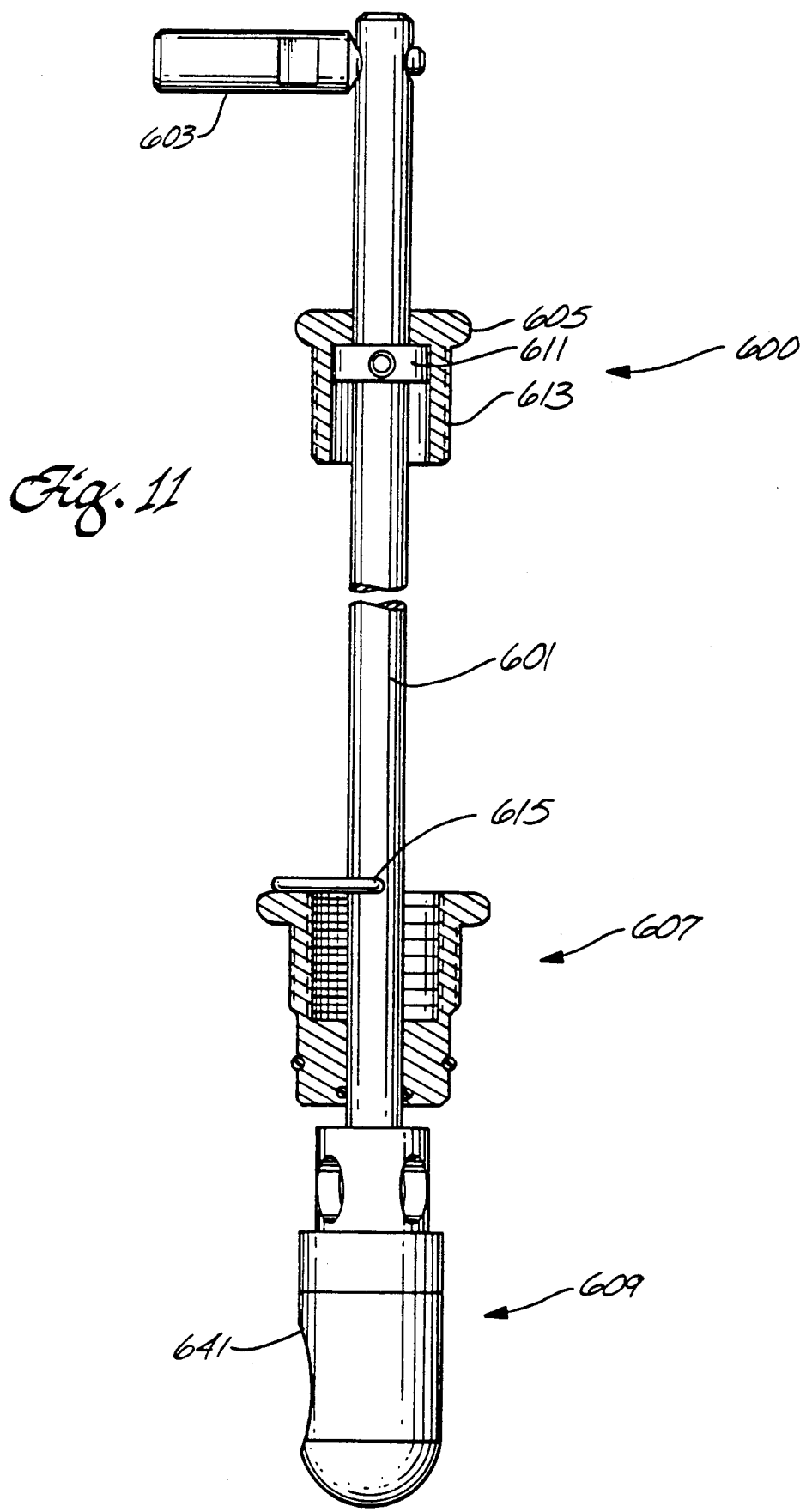
FIG. 11 is a side view of an installation fixture for applying a stopper to the pipe.

The next, major step in creating the bypass illustrated in FIG. 1 is to install the insertion assembly 600 into the fixture 200 in FIG. 4. This part of the operation begins by lowering the assembly 600, through the inlet receptacle 297, until the sealing plug 607 enters into and engages the threads of the inlet receptacle 297. The assembly 600 is, at this point, in its fully-withdrawn position, with the spring clip 615 in place, as shown in FIG. 11. The sealing plug 607 is turned until it is fully in place, so that a seal is effected between it and the inlet receptacle 297. The gate valve 251 is then opened, the spring clip 615 is removed from the shaft 601, and the shaft is pushed through the sealing plug 607 until the driving hub 605 enters the sealing plug 607.

It will be noted, from FIG. 11, that the handle 603 faces in the same direction as the inlet/outlet opening 639 of the stopper assembly 609. This is so as to enable the user to orient the opening 639 in the proper direction, by appropriately turning the shaft 601 by means of the handle 603. Since it is desired to plug the pipe 100 so as to establish a barrier between the branching saddle 109, where the bypass is to occur, and the break 101 in the pipe, the handle 603 should be turned so as to cause the inlet/outlet opening 639 to face in the direction away from the break 101 and toward the source of the gas. With the shaft 601 and the stopper assembly 609 so oriented, the driving hub 605 is screwed into the sealing plug 607, exerting an axially-downward-directed force on the shaft 601, driving it into the fixture 200 and into the pipe 100.

Figure 14:
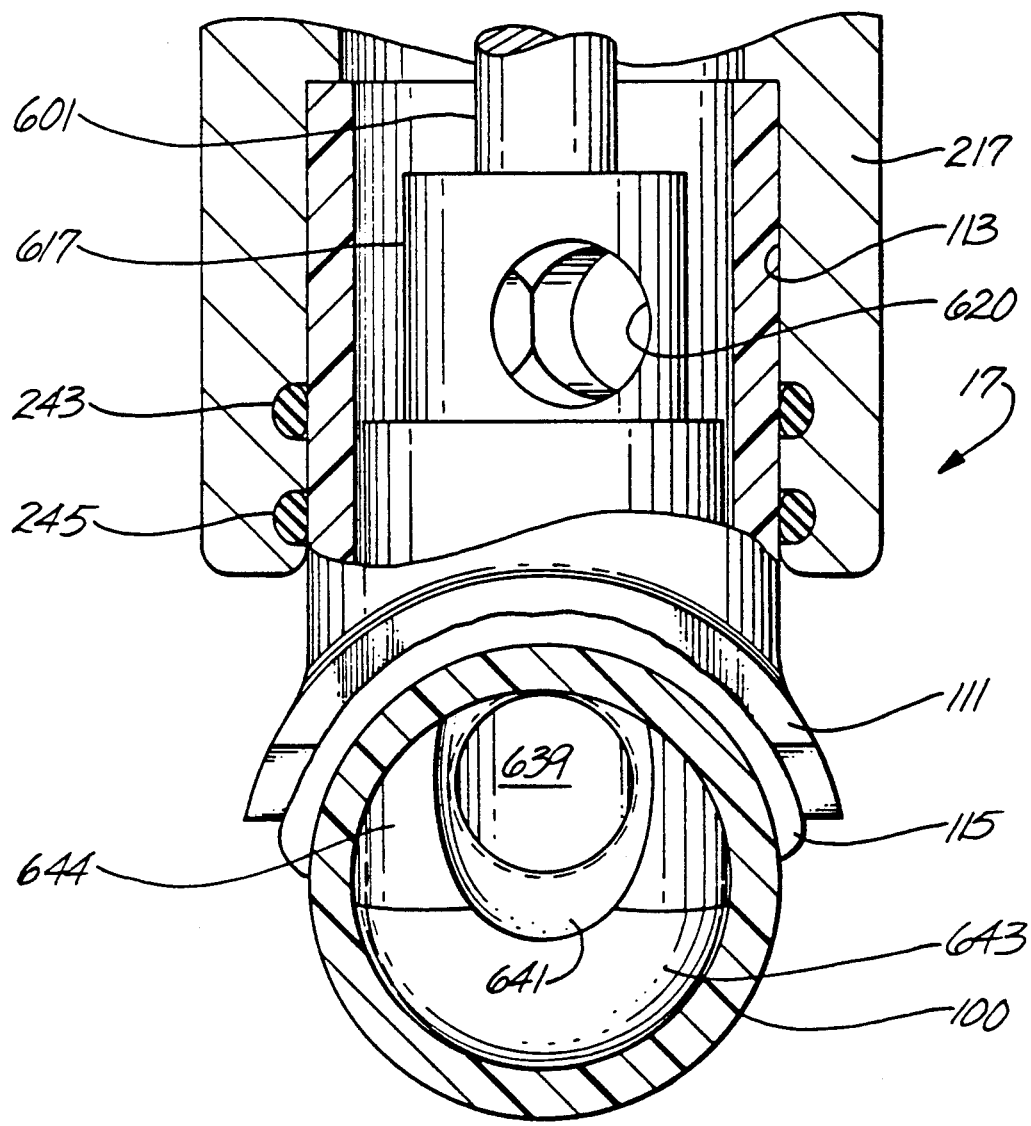
FIG. 14 is a cross-section through the pipe and through a branching saddle bonded to the pipe, with the stopper in place in the branching saddle and the pipe, blocking the pipe.

As the shaft 601 continues to be driven into the fixture 200, and the tip of the stopper assembly 609 presses against the bottom of the pipe 100, the elastomeric skin 621, and, particularly, its semi-hemispherical head 643, beings to deform. Because of the increased thickness of the elastomeric skin's head 643, there is sufficient resilience to allow the steel core 619 to cause the outer surface of the elastomeric skin to conform to the inner surface of the pipe 100. The initial and subsequent slightly-deformed shapes of the elastomeric skin are seen in FIG. 13, in solid and phantom lines B and C, respectively, and the final location of the stopper assembly 609 in the pipe 100 is illustrated in FIG. 14. As seen in that figure, the slight gap, or clearance, between the stopper assembly 609 and the wall of the pipe 100 has been filled by the slightly-deformed skin 621 of the stopper assembly. As a result, gas which had previously flowed in the pipe 100, past the fixtures 200, through the pipe sections 103 and 105, toward the rupture 101, is now blocked from the pipe sections 103 and 105, which are bypassed through the flow paths in the stopper assemblies 609 into the bores 241 of the fixtures 200. (It will be recalled that the operations described up to this point are being performed at both fixtures 200, including the installation of the stopper assemblies 609 therein.) The primary ball valves 293 are now opened, thereby completing the bypass around the pipe sections 103 and 105, through the conduit 107 extending between the primary ball valves 293. Repair of the rupture 101 may now be performed.

An alternative stopper-insertion assembly 700 is illustrated in FIGS. 15–17. Since only its stopper assembly is different, only that part is shown. The stopper assembly 701 of the alternative stopper-insertion assembly 700 features a part-cylindrical body portion 702, terminating in a part-hemispherical head portion 703, there being a smooth transition between the surfaces of the portions 702 and 703, with the exception of a mold line 705. The diameters of both portions 702 and 703 should be just slightly smaller than the inside diameter of the pipe 100. To ensure that the stopper assembly 701 blocks the flow of gas from one side of the branching saddle through which it is extended, the outer sealing surface of its part-cylindrical body portion 702 is that which is defined by a line rotated about the axis of the body by greater than 180 degrees. For added strength and rigidity, the stopper assembly is built on a rigid, preferably steel, scoop-shaped core 707, coated with an elastomeric skin 709 having a thickened head region 711. The steel core 707 has an internally-threaded collar 713, centered on the axis 715 of the body and head protons 702 and 703. Threaded into the collar 713 is the reduced, threaded end 627 of the shaft 601. The shaft 601 and all the remaining parts of the insertion assembly, including the handle 603, the driving hub 605, the pin 615, and the sealing plug 607, may be the same as for the insertion assembly 600 illustrated in FIG. 11. It should be noted that the handle 603 of the insertion assembly 700 should face in a predetermined direction relative to the open end 717, so that the open end 717 may be turned in the direction of the origin of the gas flow which is to be stopped. The alternative stopper-insertion assembly 700 is operated in the same manner as the insertion assembly 600.

The alternative stopper assembly 701 operates in a similar manner to the stopper assembly 609. It is driven in place by the advancing shaft 601, and the thickened, elastomeric region 711 on its head 703 is compressed so as to allow the stopper assembly to fill the pipe 100 by conforming to its internal contour.

Returning to the sequence of operations of which the insertion of the stopper assembly 607 or the alternative stopper assembly 701 is a part, after the break 101 has been repaired, the next stp is to remove the insertion assemblies from the fixtures 200. This step will be described with particular reference to the insertion assembly 600 of FIGS. 11–14. The assembly is first retracted by unscrewing the lead hub 605 from the sealing plug 607 and pulling up on the handle 603 until the stopper assembly 609 is fully retracted, so that the spring clip 615 may be reinserted into the shaft 601. The gate valve 251 is then closed, the secondary ball valve 291 is opened to release pressure, and the entire stopper insertion assembly is removed by unscrewing the sealing plug 607 from the receptacle 297, and lifting the entire assembly 600 out of the fixture 200.

The final step in the process is to seal the branching-saddle pipe stubs 113, through which the bypass path had been established. This is the function of the completion plug insertion assembly 800 shown in FIGS. 18–22.

Its principal parts comprise a tube 801, a shaft 803 extending through the tube, a spring-loaded socket 805, extending, partially, into the bottom end of the tube, and a completion plug 807, removably held on the end of the tube 801 against the socket 805. Also forming a principal part of the completion-plug insertion assembly 800 is a sealing plug 808, slidably mounted on the shaft 801.

In general terms, in a manner to be explained next, the sealing plug 808 is inserted by lowering the completion-plug insertion assembly 800 into the fixture 200, expanding the completion plug 807 until it is locked in place in the branching saddle 109, releasing the completion plug 807 from the rest of the insertion assembly 800, and withdrawing the assembly from the fixture 200.

The steel tube 801 has a uniform outer diameter and a stepped bore having a relatively-large terminal portion 809 and a reduced bore portion 811 extending from the bore portion 809 all the way to the upper end of the tube. A shoulder 813 is formed by the transition between the bore sections 809 and 811, forming a stop for a helical spring 815, which is compressed between the shoulder 813 and a nut 817, screwed onto the reduced, threaded end 819 of the rod 803. The socket 805 has an end wall with an internally-threaded hole 821, into which the threaded end 819 enters. The sequence in which the foregoing components are assembled is that the socket 805 and the nut 817 are screwed onto the threaded end 819, and the nut 817 is tightened against the end of the socket 805 to secure it. The spring 815 is then slipped over the top of the shaft 803, and the shaft is inserted into the tube 801, through the bottom, until the socket 805 enters the bottom of the tube 801, and the top end of the shaft 803 protrudes from the opposite, top end of the shaft 801. A cap 821 will have been installed in the top end of the tube 801. The cap has a hexagonal head 823 and an externally-threaded extension 825 adapted to be received by a matching internal thread 827 at the upper end of the tube 801. An internal bore 829 extends through the end cap 821, and it is through that bore that the upper end of the shaft 803 emerges after it has been pushed through the tube 801. The shaft 803 is secured by a handle 831, which extends through a hole 833 in the end of the shaft 803 and which is secured in place by an Allen-head screw 835.

Cut into the tube, at its bottom end, is a camming groove 837, including an axial, inlet slot portion 839 and a peripherally-extending portion 841. The camming groove 837 serves to retain the completion plug 807 at the end of the tube 801, as will be explained next.

The completion plug 807 comprises an elastomeric disk 843, sandwiched between upper and lower steel plates 845 and 847. The disk 843 and the plates 845 and 847 are all circular in cross-section. The bottom plate 847 is flat. The top plate 845 has a vertically-extending, cylindrical hub 849, from which there radially extends a camming pin 851. A threaded bolt 853 extends through axial openings in the plates 845 and 847 and in the disk 843. Threaded onto the end of the bolt 853 is a nut 855, which is dimensioned to fit the socket 805 by which it is later to be driven.

After the foregoing components of the completion plug 807 have been assembled as just described, the end of the bolt 853 is opened at 857 to prevent inadvertent unscrewing and subsequent loss of the nut 855 during operation of the insertion assembly 800.

The completion plug 807 is inserted into the end of the tube 801 by inserting the end of the plug 807, and, particularly, the nut 855, into the socket 805 until the top of the hub 849 abuts the rim of the socket 805. The plug 807 is then pressed toward the tube 801, causing the socket 805 to be pushed into the tube, compressing the spring 815. The camming pin 851 is so located on the hub 849 that the pin will enter the camming groove 837, and, more particularly, its peripheral portion 841, when the upper surface of the compression plate 845 abuts the facing edge 859 of the tube 801. This represents the fully-inserted position of the plug 807 into the tube 801, and when this position is reached, the plug 807 may be turned until the camming pin 851 falls in place in one or the other recessed end of the peripheral slot 841. When the pressure is released from the plug, the compression spring 815 will hold it securely in that end of the camming groove 837 against further rotation. It should be noted that, when the plug 807 is installed as described, the nut 855 is, at most, hand-tightened on the bolt 853, so that the compression plates 845 and 847 bear only lightly against the elastomeric disk 843. This is so as to allow the disk to fit into the branching saddle 109 during the installation procedure, to be described.

The sealing plug 808 is externally configured to be essentially similar to the corresponding sealing plug of the assembly 600, since it performs its sealing function in essentially the same manner. Toward this end, it includes a hexagonal head 859 and a cylindrical body 861 having threads 863 nearest the head 859 and an O-ring 865 near its opposite end. An axial bore 867, of uniform cross-section, runs through the sealing plug 808 and is sized to receive the tube 801 with a close fit. A positioning groove 869 is shown just above the sealing plug 808.

To perform the sealing operation, the completion-plug insertion assembly 800, assembled as shown in FIGS. 18 and 19, but in a fully retracted position, wherein the camming pin 851 abuts the bottom of the sealing plug 808, is inserted in the fixture 200 in a manner similar to the operations previously described. In particular, the sealing plug 808 of the assembly 800 is screwed into the receptacle 297 and tightened in place. The gate valve 251 is then opened, and the tube 801 is pushed through the sealing plug 808 until the positioning groove 869 is aligned with the top surface 873 of the plug 808, as shown in FIG. 19. The positioning groove 869 is so located that, when it is aligned with the surface 873, the completion plug 807 will be located in an appropriate position in the branching-saddle pipe stub 113.

With the completion-plug insertion assembly 800 positioned as described, the handle 831 may be rotated, causing the shaft 803 to turn, turning with it the spring-loaded socket 805, which is carried on the end of the shaft 803. In turn, the socket 805, which is engaged with the nut 855 of the completion plug 807, begins to advance the nut on the bolt 853, causing the top compression plate 845 to be driven toward the bottom compression plate 847. As a result, the elastomeric disk 843, between the plates 845 and 847, is progressively compressed axially and, hence, expanded radially. This process is continued until the resistance to further turning of the shaft is sufficiently large to indicate that the plug 843 has been adequately compressed axially, at which point the completion plug 807 may be detached from the remainder of the insertion assembly 800, simply by press ring down on the tube 801 and turning it until the axial portion 839 of the camming groove 837 is in alignment with the camming pin 851, at which point the pin will be free to exit the tube through the axial portion 839 of the groove 837. With the completion plug 807 in place, and detached from the remaining portion of the insertion assembly 800, the remaining portion of the assembly 800 may be withdrawn from the fixture 200. To do so, the tube 801 is pulled up until the socket 805 is above the gate valve 251, which may now be closed, after with the secondary ball valve 291 is opened to release pressure (if any), and the assembly 800 is removed by unscrewing the sealing plug 808 from the receptacle 297.

An alternative completion-plug insertion assembly 900 is illustrated in FIGS. 23 and 24 (appearing next to FIG. 10). All of its parts may be identical to the insertion assembly 800, with the exception of the construction of the completion plug, designated in FIGS. 23 and 24 as the item 901. The essential difference between the completion plug of FIGS. 18–22 and the completion plug 901 of FIGS. 23 and 24 is, that the latter features an elastomeric disk which rides on the nose of a metal plug and is compressed against a beveled rim in the branching saddle, rather than being compressed and expanded against the walls of the branching saddle. In particular, the completion plug 901 comprises a generally-cylindrical, metal core 903 having a threaded body 905, from which there extends a hexagonal hub 907. Extending from the hub 907 is a camming pin 909, which serves the same function as the camming pin 851 of FIG. 22. The threaded-core body 905 has a reduced-nose portion 911 on which is fitted an elastomeric cap 913 having a beveled outer edge 915. To receive and cooperate with the completion plug 901, the branching saddle is modified by the provision of a reduced portion 917 in its pipe stub 916, which is threaded to match the threads on the core body 905. Also, a beveled seating surface 919 is provided in the saddle portion 921 of the modified branching saddle 923, shown in FIGS. 23 and 24.

The alternative completion plug 901 of FIGS. 23 and 24 may be inserted into the remaining, unaltered portions of the insertion assembly 800 in the same manner as the completion plug 807 of FIG. 22, with the camming pin 909 being retained in the camming groove 837. The alternative completion plug 901 is lowered into place, toward the bottom of the branching saddle 923, in exactly the same manner as described previously with reference to the assembly 800. When the handle 831 is turned, and the shaft 803 turns with it, the spring-loaded socket 805, which is in engagement with the hexagonal hub 907 of the plug 901, turns the metal core 905, causing the plug 901 to be screwed into the threaded portion 917 of the branching saddle 923. The handle 831 is turned until the elastomeric disk 913 is compressed between the metal core 905 and the beveled seating surface 919 of the branching saddle 923, at which point a seal will have been effected across the pipe stub 916 of the branching saddle, the tube 801 may be disengaged, and the assembly 800 may be withdrawn in the manner described with reference to FIGS. 18–22.

Whichever version of the completion plug is used, it is desirable to assure that a good seal has been made. Consequently, after the insertion assembly 800 has been withdrawn, the inspection light 500 is installed again, and a visual inspection of the sealing plug is made. As a further precaution, before removing the inspection light, both the primary and secondary valves 293 and 291 may be closed, and the gate valve 251 opened, for several minutes, after which the pressure gauge 285 may be observed. The absence of a pressure buildup inside the bore 241 may be taken as an indication that the branching saddle 109 has been completely sealed. The fixtures 200 may then be removed, and, as a final step, polyethylene caps (not shown) may be screwed or fused onto the branching-saddle pipe stubs 113 by conventional means, to provide a backup seal.

There has been described, in some detail, a method whereby the flow of gas through a pipe may be temporarily cut off from a break until the break can be repaired. The method and the novel apparatus for carrying out the method have been described in the context of a pipeline through which gas is fed by pressure on one side of the break only, and where it is desired to continue service to customers on both sides of the break, necessitating the installation of a bypass around the break in the pipe. Under those circumstances, it is necessary not only to block the pipe both upstream and downstream of the break, necessitating the use of two fixtures, but also to provide a path from the upstream end of the pipe to a bypass conduit and a return path from the bypass conduit to the downstream portion of the pipe. It will be apparent that, where the above circumstances do not prevail, simpler alternatives may be used. For example, if service is to be preserved to customers on only one side of the break, only one fixture needs to be used. Furthermore, in such an event, it is not necessary to effect a bypass at all. In that case, it is sufficient simply to open a hole in the wall of the pipe, by means of the invention, and, through the hole, to insert a stopper which provides no opening for a bypass path. While both of the disclosed stopper assemblies may be used in that manner, simply by so turning them that their unapertured wall portions face toward the upstream end of the pipe, a simpler expedient, which is fully within the scope of the invention, is to so configure the stopper assemblies that they are essentially solid. Such a solid stopper assembly might, for example, be in the same shape as the stopper assembly 609 of FIGS. 11–14, but without the openings 639, 629, 631, and 625.

In an effort to provide a concrete example of the invention, several of the components have been identified as to specific materials. Thus, steel has been called out as the material for parts where strength is required. It will be understood that other materials, usually metals, may be used instead of steel, so long as they possess the requisite strength. Similarly, aluminum has been cited as the material from which the principal portions of the fixture 200 may be fabricated. Aluminum has been cited because it is easy to machine and has the requisite strength to withstand the pressures which will prevail inside the fixture. Again, it should be understood that, where ease of machining is not a consideration, other metals may be used, and that, indeed, if plastics of sufficient strength are found, they can be used instead of aluminum.

It will be understood that, whereas the fixture 200 has been shown as being affixed to a pipe on which a branching saddle has been bonded so that its pipe-stub centerline is vertical, the fixture could equally be used with a branching saddle which is so mounted on the pipe that its pipe-stub centerline is at an angle other than vertical. Thus, with a horizontally-extending branching-saddle pipe stub, the fixture 200 would be affixed to the pipe 100 with the fixture's centerline horizontal, as well. Consequently, where reference is made in the specification and claims to "lower" and "upper," it should be understood that they are used to designate elements on the fixture which are respectively nearest and farthest from the pipe 100, and not necessarily to designate elements which are higher or lower in the vertical sense.

These and other modifications of the invention will occur to those skilled in the art, it being understood that the only limitation on the invention is that which appears in the claims.

What is claimed is:

1. An insertion assembly for boring a hole through the wall of a pipe having a branching saddle thereon, with a pipe stub extending from the branching saddle comprising:
   a) shaft;
   b) a shell cutter mounted on and extending axially from one end of said shaft;
   c) a threaded lead hub, rockably and non-rotatably mounted on said shaft coaxially therewith, spaced apart from said cutter and restricted against axial movement along said shaft toward said cutter, said lead hub having a bore through which said shaft extends, said bore being slightly larger than the shaft so as to enable the shaft to swing within the hub enough to facilitate entry of the cutter into the pipe stub; and
   d) a threaded sealing plug slidably mounted coaxially on, and sealed against, said shaft between said cutter and said lead hub and adapted to receive said lead hub when said shaft is slid through said sealing plug so that said lead hub may be screwed into said sealing plug by rotating said shaft, and the shaft and the cutter thereon may be axially advanced relative to said sealing plug.

2. An apparatus for cutting a hole in the wall of a pressurized pipe through a branching saddle fitting having a pipe stub extending therefrom comprising:
   a) a barrel having first and second sealable inlets at opposite first and second ends, respectively;
   b) a valve within said barrel between said ends dividing said barrel into first and second chambers adjacent said first and second ends, respectively;
   c) a valve port extending into said first chamber through the wall of said barrel;
   d) means for attaching said fixture to said pipe, with the second end of said barrel fitted onto said branching saddle fitting;
   e) an externally-threaded sealing plug removably mounted in said first sealable inlet and having an axial bore;
   f) a shaft slidably extending through the bore of said sealing plug;
   g) a cutter mounted on and extending axially from one end of said shaft;
   h) an externally-threaded lead hub adapted to be threaded into said sealing plug;
   an axial bore extending through said lead hub, said shaft extending through said axial bore; and
   j) pinning means for pivotably attaching said lead hub to said shaft, there being a sufficient clearance between said shaft and the bore of said lead hub to permit said lead hub to rock on said shaft about said pining means so as to enable the shaft to swing within the hub enough to facilitate entry of the cutter into the pipe.

3. The apparatus of claim 2, wherein an axial bore extends through each said lead hub, each said shaft is pivotally attached to the lead hub through which it extends, and there is sufficient clearance between the sealing plug bore and the shaft which extends through it to permit rocking of that shaft about its pivot point.

4. The apparatus of claim 2, additionally including a second threaded sealing plug removably mountable in said first sealable inlet in place of said first sealing plug and having an axial bore, a second shaft slidably extending through the bore of said second sealing plug, a deformable stopper on one end of said second shaft, and second means for driving said second shaft through said second sealing plug toward said pipe until said deformable stopper is seated in and blocks said pipe.

5. An insertion assembly for boring a hole through the wall of a pipe having a midpoint lying on the axis of said pipe, comprising:
  a) shaft;
  b) a shell cutter mounted on and extending axially from one end of said shaft, said shell counter having a cutting end;
  c) a threaded lead hub non-rotatably mounted on said shaft coaxially therewith, spaced apart from said cutter and restricted against axial movement along said shaft toward said cutter, said lead hub having a first stopping face at a fixed predetermined distance from said cutter end; and
  d) a threaded sealing plug
    i) having a second stopping surface;
    ii) slidably mounted coaxially on and sealed against said shaft between said cutter and said lead hub; and
    iii) adapted to receive said lead hub when said shaft is slid through said sealing plug so that said lead hub may be screwed into said sealing plug by rotating said shaft, and the shaft and the cutter thereon may be axially advanced relative to said sealing plug until said first and second stopping faces abut, said predetermined distance being such that when said shaft reaches the limit of its travel, said cutting end is at the mid-point of said pipe.

6. An apparatus for cutting a hole in the wall of a pressurized pipe having a midpoint lying on the axis of said pipe through a branching saddle fitting, comprising:
  a) a barrel having first and second sealable inlets at opposite first and second ends, respectively;
  b) a valve within said barrel between said ends dividing said barrel into first and second chambers adjacent said first and second ends, respectively;
  c) a valved port extending into said first chamber through the wall of said barrel;
  d) means for attaching said fixture to said pipe, with the second end of said barrel fitted onto said branching saddle fitting;
  e) a threaded sealing plug removably mounted in said first sealable inlet, said plug having a first stopping face and having an axial bore;
  f) a shaft slidably extending through the bore of said sealing plug;
  g) a cutter mounted on and extending axially from one end of said shaft, said cutter having a cutting end;
  h) a threaded lead hub;
    i) non-rotatably mounted on said shaft coaxially therewith;
    ii) spaced apart from said cutter,
    iii) restricted against axial movement along said shaft toward said cutter,
    iv) having a second stopping face at a fixed predetermined distance from said cutting end and facing said first face to establish therewith a limit to the travel of said shaft toward said pipe when said ends meet, and
    v) adapted to be threaded into said sealing plug so that when said shaft is slid through said sealing plug, said lead hub may be screwed into said sealing plug by rotating said shaft, and the shaft and the cutter thereon may be axially advanced relative to said sealing plug into said pipe until said shaft reaches the end of its travel when said first and second stopping faces meet, said predetermined distance being such that when said shaft reaches the limit of its travel, said cutting end is at the mid-point of said pipe.

* * * * *